(12) United States Patent
Ketterer et al.

(10) Patent No.: US 12,025,433 B2
(45) Date of Patent: Jul. 2, 2024

(54) DETECTION DEVICE AND METHOD FOR DETECTING MULTIPLE OBJECT DATA SETS OF AT LEAST ONE OBJECT

(71) Applicant: Robert Bosch GmbH, Stuttgart (DE)

(72) Inventors: Christin Ketterer, Renningen (DE); Darno Alexander Ketterer, Renningen (DE); Julian Weiss, Leonberg (DE); Sebastian Schmitt, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1070 days.

(21) Appl. No.: 16/759,498

(22) PCT Filed: Oct. 26, 2018

(86) PCT No.: PCT/EP2018/079470
§ 371 (c)(1),
(2) Date: Jul. 21, 2020

(87) PCT Pub. No.: WO2019/081741
PCT Pub. Date: May 2, 2019

(65) Prior Publication Data
US 2020/0363242 A1    Nov. 19, 2020

(30) Foreign Application Priority Data
Oct. 27, 2017   (DE) .......................... 102017219407.3

(51) Int. Cl.
*G01B 11/04*    (2006.01)
*B07C 3/08*    (2006.01)
(Continued)

(52) U.S. Cl.
CPC .............. *G01B 5/0002* (2013.01); *B07C 3/08* (2013.01); *B07C 5/10* (2013.01); *B07C 5/28* (2013.01);
(Continued)

(58) Field of Classification Search
CPC ........... G06T 7/521; G06T 2207/10016; G06T 2207/10028; G06T 2207/10056; G06T 2207/10152; G06T 2207/30164; G06T 7/40; G06T 7/70; G06T 15/20; B23Q 17/24; B23Q 3/18; B23Q 3/186; A61M 1/06;
(Continued)

(56) References Cited

U.S. PATENT DOCUMENTS 5,446,515 A    8/1995  Wolfe et al.
2006/0273167 A1    12/2006  Balassari
(Continued)

FOREIGN PATENT DOCUMENTS

CN    106981085 A    7/2017

OTHER PUBLICATIONS

International Search Report for PCT/EP2018/079470, issued Jan. 25, 2019.

*Primary Examiner* — Masum Billah
(74) *Attorney, Agent, or Firm* — NORTON ROSE FULBRIGHT US LLP; Gerard A. Messina

(57) ABSTRACT

A detection device for an least semiautomated detection of multiple object data sets of at least one object is described. The detection devices includes a movement device for generating a defined relative movement between at least one object data detection unit and the at least one object.

12 Claims, 11 Drawing Sheets

(51) Int. Cl.
- *B07C 5/10* (2006.01)
- *B07C 5/28* (2006.01)
- *B07C 5/36* (2006.01)
- *B25J 9/16* (2006.01)
- *G01B 5/00* (2006.01)
- *G01B 11/24* (2006.01)
- *G01D 21/02* (2006.01)
- *H04N 7/18* (2006.01)
- *H04N 23/54* (2023.01)
- *H04N 23/55* (2023.01)
- *H04N 23/56* (2023.01)
- *H04N 23/61* (2023.01)
- *H04N 23/695* (2023.01)
- *H04N 23/90* (2023.01)

(52) U.S. Cl.
CPC .............. *B07C 5/36* (2013.01); *B25J 9/1664* (2013.01); *B25J 9/1669* (2013.01); *B25J 9/1697* (2013.01); *G01B 11/04* (2013.01); *G01B 11/24* (2013.01); *G01D 21/02* (2013.01); *H04N 7/18* (2013.01); *H04N 23/54* (2023.01); *H04N 23/55* (2023.01); *H04N 23/56* (2023.01); *H04N 23/61* (2023.01); *H04N 23/695* (2023.01); *H04N 23/90* (2023.01); *B07C 2501/0063* (2013.01); *G01B 2210/54* (2013.01)

(58) Field of Classification Search
CPC ...... A61M 1/062; A61M 1/066; A61M 1/067; A61M 1/06935; A61M 1/0697; A61M 2205/07
USPC ........................................... 348/142
See application file for complete search history.

(56) References Cited

U.S. PATENT DOCUMENTS

| | | | |
|---|---|---|---|
| 2010/0082151 | A1 | 4/2010 | Young |
| 2013/0085389 | A1* | 4/2013 | Tsang ................. A61B 8/48 600/442 |
| 2013/0176481 | A1 | 7/2013 | Holmes et al. |
| 2013/0329073 | A1* | 12/2013 | Majewicz ........... G06V 10/141 348/222.1 |
| 2014/0111615 | A1* | 4/2014 | McGuire .............. G01B 11/24 348/46 |

* cited by examiner

DETECTION DEVICE AND METHOD FOR DETECTING MULTIPLE OBJECT DATA SETS OF AT LEAST ONE OBJECT

BACKGROUND INFORMATION

A detection device for detecting multiple object data sets of at least one object has already been provided.

SUMMARY

In accordance with an example embodiment of the present invention, a detection device for an at least semiautomated detection of multiple object data sets of at least one object is provided including a movement device for generating a defined relative movement between at least one object data detection unit and the at least one object.

An "object data set" includes at least two different pieces of object data concerning the same object. A multiple object data set preferably includes more than ten different pieces of object data concerning the same object. A multiple object data set particularly preferably includes more than one hundred different pieces of object data concerning the same object. A multiple object data set preferably includes at least two different types of object data concerning the same object. "Object data" are understood in particular to mean at least one piece of information that is suitable for characterizing an object, in particular for distinguishing from another object. Object data preferably include characteristics that are inherent to an object. Object data may in particular include appearance, shape, contour, color, symmetry, weight, material, and/or some other characteristic that appears meaningful to those skilled in the art. It is also possible for situation-related characteristics to be detected, for example a relative configuration with respect to another object, in particular a counterpart, a degree of pollution, and/or a temporary marking.

An "object data detection unit" is understood in particular to mean a unit that is provided at least for detecting a type of object data. The object data detection unit is preferably an imaging detection unit. In particular, the object data detection unit includes a still camera. Alternatively, the object data detection unit includes a movie camera. The object data detection unit preferably includes a true color camera. It is also possible for the object data detection unit to include an infrared camera and/or a ToF camera. An object data set preferably includes at least two different recordings by the object data detection unit. A multiple object data set particularly preferably includes at least ten different recordings of the object data detection, in particular from ten different perspectives.

A "defined relative movement" is understood in particular to mean a relative change in the position and/or orientation that is actively controllable and/or regulatable, at least in a regular operating state of the detection device. A defined relative movement is preferably controllable and/or regulatable along each degree of freedom of motion. In particular, in at least one regular operating state of each detection of object data using the object data detection unit, position data regarding the relative position and/or orientation of the object data detection unit may be unambiguously associated with the object.

In accordance with an example embodiment of the present invention, a movement device for generating a defined relative movement includes at least one drive unit and a guide unit. A drive unit of the movement device preferably has an electromechanical design, and in particular is designed as an electric motor or as a piezoelement, for example for fine adjustment. However, it is also possible for a drive unit of the movement device to have a pneumatic or hydraulic design. A guide unit is provided in particular for guiding an object along the defined relative movement. In particular, a guide unit is provided for minimizing a movement along a direction that is different from the defined relative movement. A guide unit may be designed as a guide rail, swivel arm, and/or articulated arm, for example. The movement device is preferably provided for generating a defined relative movement between at least one object data detection unit and the at least one object. In particular, the movement device is provided for generating a defined relative movement between at least one object data detection unit and an object carrier unit that is provided in particular for positioning the object in an object data detection area of the detection device.

A "semiautomated detection" is understood in particular to mean that at least one multiple object data set is detected unattended, i.e., in particular without intervention by an operator, in at least one operating state.

"Provided" is understood in particular to mean specially programmed, designed, and/or equipped. That an object is provided for a certain function is understood in particular to mean that the object fulfills and/or carries out this certain function in at least one application state and/or operating state.

Due to the design according to the present invention of the detection device, it is advantageously possible to quickly detect a large object data volume concerning an object.

Furthermore, in accordance with an example embodiment of the present invention, the movement device is provided for detecting object data from multiple perspectives. In particular, a detection of object data from multiple perspectives may be achieved by a defined relative movement between the object data detection unit and the object that is generated with the aid of the movement device. A "perspective" is understood in particular to mean a certain relative arrangement, in particular position and/or orientation, of the object data detection unit and of the object, in particular of the object carrier unit. Two perspectives are preferably regarded as identical when they differ solely by a relative distance between the object data detection unit and the object.

In particular, multiple perspectives include at least two different relative arrangements of the object data detection unit and of the object, in particular of the object carrier unit. Multiple perspectives preferably include more than ten different relative arrangements of the object data detection unit and of the object, in particular of the object carrier unit. Multiple perspectives particularly preferably include more than ten different arrangements of the object data detection unit relative to the object, in particular the object carrier unit. In particular, two perspectives define a detection plane.

Multiple perspectives preferably include at least two different detection planes. The entirety of all detection planes that are possible with the movement device is preferably space-filling. Alternatively, a distance between two possible detection planes is at least smaller than 1 mm, and/or an angular distance between two possible detection planes is at least less than 1°. Due to the design according to the present invention of the detection device, multiple object data sets may advantageously include object data from all sides of the object.

In addition, in accordance with an example embodiment of the present invention, the detection device includes a processing unit that is provided for carrying out an object learning process. An "object learning process" is understood in particular to mean processing of the multiple object data sets for a further use. For example, an object learning process may include the creation of a 360-degree view of the object, the creation of a three-dimensional model of the object, and/or the extraction of characteristic features, in particular to allow pattern recognition. The processing unit preferably has a design that is physically separate from the movement device and/or the object data detection unit. The processing unit is preferably designed as a server. Alternatively, the processing unit is integrated into the object data detection unit. A "processing unit" is understood in particular to mean a unit with an information input, information processing, and an information output. The processing unit advantageously includes at least one processor, a memory, input and output devices, further electrical components, an operating program, regulation routines, control routines, and/or computation routines. The components of the processing unit are preferably situated on a shared circuit board and/or advantageously in a shared housing. Due to the design according to the present invention of the detection device, in particular processing of the multiple object data sets for a uniform digital representation of the object may be achieved.

Moreover, in accordance with an example embodiment of the present invention, a further processing unit is provided which is provided for utilizing a forward movement and a backward movement of an object data detection unit and/or of an object for data detection. The movement device and the object data detection unit are preferably controlled and/or regulated by an in particular central processing unit. In particular, the processing unit controls and/or regulates the defined relative movement and at least the detection point in time of the object data detection unit. The movement device preferably has a defined starting position from which a defined relative movement starts. The further processing unit is preferably provided in particular for generating and/or changing in a targeted manner a forward movement and a backward movement of an object data detection unit and/or of an object for a defined data detection. A "starting position of the movement device" is understood in particular to mean that at least the object data detection unit and/or the object, in particular the object carrier unit, are/is situated at a fixed position within the movement device. The starting position of the movement device preferably includes an orientation of the object data detection unit and/or of the object, in particular the object carrier unit. In a starting position of the movement device, all movable units and elements of the movement device are particularly preferably situated at a fixed position and have a fixed orientation. A "forward movement" is understood in particular to mean a movement that leads away from the starting position. A "backward movement" is understood in particular to mean a movement that leads toward the starting position. A backward movement may be achieved by reversing the movement path during the forward movement, or by continuing to move along a closed movement path. Due to the design according to the present invention of the detection device, a dead time of the machine between two detections of various multiple object data sets for returning to the starting position of the movement device may advantageously be minimized.

In addition, in accordance with an example embodiment of the present invention, the movement device includes at least one movement unit for a defined movement of the at least one object data detection unit. The movement unit includes at least one guide unit of the object data detection unit and a drive unit. Furthermore, in accordance with an example embodiment of the present invention, the movement unit is provided for guiding the at least one object data detection unit on a movement path that is at least partially curved. A "partially curved movement path" is understood in particular to mean that a course of the movement path has a curvature different from zero in at least one subarea. A "partially curved movement path" is preferably understood to mean that the movement path includes a circular arc. The circular arc preferably encompasses a center angle of greater than 90°. The circular arc particularly preferably encompasses a center angle of greater than 180°. It is also possible for the movement path to describe a complete circle. In particular, a midpoint of a circular arc of the at least partially curved movement path defines a midpoint of an object detection area that is provided for recording an object for a detection. In this context, a "curvature" in a point on a course that is different from zero is understood in particular to mean a deviation from a straight line that increases quadratically with the distance from the point on the course. Due to the design according to the present invention of the detection device, a change in perspective may advantageously be made in a simple manner.

Furthermore, in accordance with an example embodiment of the present invention, the movement unit includes at least one partially curved path, and is provided for guiding the at least one object data detection unit along the at least partially curved path. The movement unit for guiding the object data detection unit, as a guide unit, preferably includes a curved path, in particular a curved guide rail and/or a curved guide rod. The object data detection unit is preferably mounted on a guide carriage which in at least one operating state of the detection device is moved along the curved path with the aid of the drive unit. A "partially curved path" is understood in particular to mean that a course of the path has a curvature different from zero in at least one subarea. A "partially curved path" is preferably understood in particular to mean that the path encompasses a circular arc. The circular arc preferably encompasses a center angle of greater than 90°. The circular arc particularly preferably encompasses a center angle of greater than 180°. It is also possible for the path to describe a complete circle. It is also possible for a curvature of the path to be approximated by at least two straight path segments that enclose an obtuse or acute angle. The path segments are preferably connected to one another by a curved path segment to form a continuous movement path of the object detection unit. Alternatively, each in particular straight path segment includes at least one dedicated object detection unit. Due to the design according to the present invention of the detection device, a change in perspective may advantageously be made in a simple manner.

Moreover, in accordance with an example embodiment of the present invention, the movement unit is provided for guiding the at least one object data detection unit along a direction that is at least essentially perpendicular to a movement path. In particular, the movement unit may generate a superimposed movement of the object data detection unit along the movement path and perpendicular to the movement path. The term "essentially perpendicular" is intended here to define in particular an orientation of a direction relative to a reference direction, the direction and the reference direction, in particular viewed in a plane extending in parallel to the direction and to the reference direction, enclosing an angle of 90°, and the angle having a maximum deviation of in particular less than 8°, advantageously less than 5°, and particularly advantageously less than 2°. In particular, the object data detection unit is movably supported along a straight line that intersects the object detection area and the object data detection unit. Due to the design according to the present invention of the detection device, a working distance of the object data detection unit, in particular a focus, may advantageously be adjusted quickly and easily. In particular, a cost-effective object data detection unit with a small span of the working distance may be used. It is also possible for the movement unit to have a swivel axis and/or rotational axis about which the guide unit of the object data detection unit itself is swivelably and/or rotatably supported. Due to the design according to the present invention of the detection device, multiple object data sets may advantageously include object data from all sides of the object. It is also possible for the guide unit of the object data detection unit to be translationally movably supported, in particular in order to detect an object having a maximum extension that is greater than a maximum extension of the guide unit.

In addition, in accordance with an example embodiment of the present invention, the object data detection unit has at least one swivel axis and/or rotational axis about which the object data detection unit is swivelably and/or rotatably supported. In particular, the object data detection unit is swivelably and/or rotatably supported about a straight line that intersects the object detection area and the object data detection unit. Due to the design according to the present invention of the detection device, a detection area, in particular an image format, of an in particular imaging object data detection unit may advantageously be adapted to the object. The object data detection unit preferably has a rotational axis and/or swivel axis that are/is essentially perpendicular to the movement path of the object data detection unit. The rotational axis and/or swivel axis preferably allow(s) an orientation of a side of the object data detection unit that is provided for detecting, in particular during and/or after a movement along the movement path, that is essentially perpendicular to a straight line that intersects the object detection area and the object data detection unit. Due to the design according to the present invention of the detection device, a detection area of an object data detection unit may be adapted to an object. Object data may be maximized with a detection, while at the same time, data concerning a background may be minimized.

Furthermore, in accordance with an example embodiment of the present invention, the movement unit includes a drive unit that is provided for moving the object data detection unit in an automated manner. In particular, "automated" is understood to mean that the drive unit is controlled and/or regulated via an in particular central processing unit. In particular, the processing unit controls and/or regulates the drive unit based on a list of in particular predetermined perspectives from which the object is to be detected. In another embodiment, the processing unit could preliminarily evaluate a data set in order to dynamically adapt the list. A multiple data set may advantageously be quickly detected.

Furthermore, in accordance with an example embodiment of the present invention, the detection device includes at least one, in particular the above-mentioned, object carrier unit. The object carrier unit is provided in particular for positioning the object in an object data detection area of the detection device. In particular, the object carrier unit includes at least one object carrier with an object carrier wall that is provided for absorbing a weight of an object. In particular, in at least one operating state of the detection device the object carrier is provided for an object to be deposited on the object carrier, in particular on the object carrier wall. The object carrier wall preferably includes no depressions and/or elevations. Alternatively, the object carrier wall may have a curvature to reduce the likelihood of in particular a round and/or lightweight object falling down from the object carrier. It is also possible for an in particular exchangeable object carrier to include a locking unit for fixing an object on the object carrier. The object carrier preferably has a circular design in at least one section plane. Due to the design according to the present invention of the detection device, an object detection area may be identified. In particular, optimal positioning of an object to be detected in the object detection area may be facilitated.

Moreover, in accordance with an example embodiment of the present invention, the movement device includes a bearing unit via which the object carrier unit is movably supported. Due to the design according to the present invention of the detection device, a defined relative movement between the object and the object data detection unit may advantageously take place in numerous ways.

Furthermore, in accordance with an example embodiment of the present invention, the bearing unit includes at least one swivel axis and/or rotational axis about which the object carrier unit is swivelably and/or rotatably supported. The object carrier unit preferably has a vertical swivel axis and/or rotational axis. The swivel axis and/or rotational axis preferably coincide(s) with an axis of symmetry of the object carrier unit. Due to the design according to the present invention of the detection device, a multiple object data set may include object data from various sides of the object.

In addition, in accordance with an example embodiment of the present invention, the bearing unit at least partially encloses the object carrier unit. "Partially encloses" is understood in particular to mean that the object carrier unit is situated in a recess of the bearing unit. "Partially encloses" is preferably understood to mean that a largest side face of a smallest imaginary cube that still completely encloses the unit protrudes into a recess of the bearing unit. This is preferably understood to mean in particular that in at least one plane in which the geometric midpoint is situated, at least one geometric midpoint of the object carrier unit is enclosed by the bearing unit over an angular range of at least 140°, preferably at least 180°. The object carrier unit is preferably situated at a lateral recess of the bearing unit. Alternatively, the bearing unit is situated on a bottom side of the object carrier unit, in particular a side facing away from the object detection area. The bearing unit is preferably offset with respect to the vertical rotational axis and/or swivel axis, so that in particular a movement path of the object data detection unit below the object carrier unit may be continued. Due to the design according to the present invention of the detection device, a stable arrangement of the object carrier unit may be achieved. In particular, an arrangement of the bearing unit that is offset from the rotational axis may be achieved.

Furthermore, in accordance with an example embodiment of the present invention, the bearing unit includes at least one movement path along which the object carrier unit is movably supported. The movement path is preferably in parallel to a straight line that intersects the object detection area and the object data detection unit. In particular, the movement path extends vertically. With the aid of the bearing unit, the object carrier unit is preferably movably supported, at least translationally, along a linear axis that extends at least essentially in parallel, in particular coaxially, to the rotational axis and/or swivel axis. The bearing unit preferably includes at least one lifting unit, with the aid of which the object carrier unit is movably supported along the movement path. The lifting unit may be designed as a scissor joint, as a linear bearing, as a telescoping bearing, or the like. Due to the design according to the present invention of the detection device, a working distance, in particular a focus, may advantageously be set quickly and easily. In particular, a cost-effective object data detection unit with a small span of the working distance may be used. Alternatively or additionally, a horizontal movement path is possible in order to detect an object having a maximum extension that is greater than a maximum extension of the object carrier unit.

In addition, in accordance with an example embodiment of the present invention, the movement device includes a drive unit that is provided for moving the object carrier unit in an automated manner. The drive unit may include at least one actuator, in particular a linear actuator such as an electrical, hydraulic, or pneumatic lifting cylinder or the like, an electric motor, a magnetic drive, or the like for moving the object carrier unit. In particular, "automated" is understood to mean that the drive unit is controlled and/or regulated via an in particular central processing unit. In particular, the processing unit controls and/or regulates the drive unit based on a list of in particular predetermined perspectives from which the object is to be detected. In another embodiment, the processing unit could preliminarily evaluate a data set in order to dynamically adapt the list. The drive unit is preferably provided for moving the object carrier unit and the object data detection unit oppositely from one another, in particular oppositely about the swivel axis and/or rotational axis of the bearing unit, in particular in at least one operating state of the detection device. It is also possible for the drive unit in at least one further operating state of the detection device to be provided for moving the object carrier unit and the object data detection unit in the same movement direction relative to one another, in particular in the same movement direction about the swivel axis and/or rotational axis of the bearing unit, in particular at different speeds. In addition, it is also possible for the drive unit in at least one additional operating state of the detection device to be provided for holding the object carrier unit in a fixed position and moving only the object data detection unit relative to the object carrier unit, in particular about the swivel axis and/or rotational axis of the bearing unit. The drive unit preferably includes at least one actuator that is associated with the object carrier unit, and a further actuator that is associated with the object data detection unit. However, it is also possible for the drive unit to include a single actuator that is provided for moving the object carrier unit and for moving the object data detection unit via a gear unit. Furthermore, it is also possible for the drive unit to be designed as a magnetic drive unit, and to be provided for moving the object carrier unit and the object data detection unit oppositely from one another, in particular oppositely about a swivel axis and/or rotational axis of the bearing unit. The drive unit is preferably provided for moving the object carrier unit and the object data detection unit along opposite main movement directions. The drive unit is preferably provided for moving the object data detection unit along one direction in order to move the object carrier unit, and for moving the object carrier unit in the opposite direction relative to the object data detection unit in order to move the swivel axis and/or rotational axis of the bearing unit. With the aid of the embodiment according to the present invention, a plurality of various recordings of an object may advantageously be detected from different detection angles in a short time period in order to advantageously detect a multiple data set for the object. A multiple data set may advantageously be quickly detected.

Moreover, in accordance with an example embodiment of the present invention, the object carrier unit includes at least one object carrier which in at least one operating state includes a transparent object carrier wall. "Transparent" is understood in particular to mean that a transmittance of the object carrier wall, in particular at an average wavelength of the spectrum that is detectable with the object data detection unit, is at least greater than 80%, preferably greater than 90%, and particularly preferably greater than 95%. The object carrier is preferably made of a transparent material, for example glass or a polycarbonate. A side of the object facing the object carrier wall may advantageously be detected by a position of the object data detection unit on a side of the object carrier opposite from the object.

Furthermore, in accordance with an example embodiment of the present invention, the object carrier unit includes an adjustment unit with the aid of which a reflectance, an absorbance, and/or a transmittance are/is adjustable. On the object carrier wall, the object carrier preferably includes a layer made of a material whose optical properties change by applying a voltage. In particular, on the object carrier wall the object carrier includes a layer made of electrochromic glass or liquid crystal glass. The adjustment unit is preferably provided for supplying the layer with an adjustable voltage. Due to the design according to the present invention of the detection device, a change may advantageously be easily made between a transparent background and a non-transparent background.

In addition, in accordance with an example embodiment of the present invention, the object carrier unit is provided for an active illumination. An "active illumination" is understood in particular to mean that the object carrier unit itself includes an illumination unit and/or that an illumination unit, viewed from the object data detection unit, is situated behind the object carrier unit and at least partially radiates through it. The object carrier preferably includes at least one layer, for example a layer of opaque flint glass, that diffusely scatters the light emanating from the illumination unit. The illumination unit may preferably emit light in various colors. The illumination unit preferably includes at least two illumination elements that are separately controllable. In a further embodiment, the illumination unit may include a plurality of separately controllable illumination elements that are distributed on a surface that at least partially surrounds the object detection area. Due to the design according to the present invention of the detection device, an illumination of the object may advantageously be adapted. In particular, a contrast of the object carrier unit with an object resting on it may be maximized by a color adjustment.

Moreover, in accordance with an example embodiment of the present invention, the object carrier unit includes at least one light source. A light source is preferably situated on the side opposite from the object carrier wall. It is also possible for a light source to be embedded in the object carrier. In addition, in accordance with an example embodiment of the present invention, the object carrier unit includes at least one light-emitting diode, in particular at least one organic light-emitting diode. In particular, the at least one light-emitting diode is provided to let the object carrier unit light uniformly, in particular in various adjustable colors. Due to the design according to the present invention of the detection device, an illumination of the object may advantageously be adapted. In particular, a contrast of the object carrier unit with an object resting on it may be maximized by a color adjustment.

Furthermore, in accordance with an example embodiment of the present invention, the object carrier unit transports at least two detachably connected object carriers. In the present context, "detachably" is understood in particular to mean "nondestructively separable." The object carrier unit preferably includes a counterpart that is complementary to the object carrier. In particular, the object carrier and the complementary counterpart are connected in a form-fit and/or force-fit manner in at least one operating state of the detection device. For example, the object carrier and the complementary counterpart are temporarily connected via a guide rail, a detent connection, a magnet unit, and/or some other connection that appears meaningful to those skilled in the art. It is also possible for the object carrier unit as a whole to be detachably connected to the bearing unit. Due to the design according to the present invention of the detection device, an object carrier unit may advantageously be loaded with an object in a quick and simple manner.

In addition, in accordance with an example embodiment of the present invention, a transport unit is provided for supplying objects to an object detection area in an at least partially automated manner. "Supplying in a partially automated manner" is understood in particular to mean that an object is transported unattended, at least from a starting point of the transport unit to the object detection area. Transport from the object detection area to an end point of the transport unit is preferably unattended. A starting point is in particular a loading zone of the transport unit. An end point is in particular an unloading zone of the transport unit. An exchange of an object in the object detection area preferably takes place automatically. In particular, the transport unit is controlled by the in particular central processing unit. Due to the design according to the present invention of the detection device, multiple object data sets of multiple objects may advantageously be quickly detected.

Moreover, in accordance with an example embodiment of the present invention, the transport unit includes a path conveyor unit, in particular a conveyor belt unit. Other embodiments of the path conveyor unit are also possible, for example as a roller conveyor. Alternatively, the transport unit may be designed as an autonomous floor conveyor unit or as a robotic arm. Due to the design according to the present invention of the detection device, a large number of objects may advantageously be quickly supplied to the object detection area.

Furthermore, in accordance with an example embodiment of the present invention, the transport unit includes a positioning unit for positioning an object in an object detection area, in particular down from the path conveyor unit. In particular, the positioning unit is designed as a compartment, a gripper arm, and/or a magnetic arm. In particular, the positioning unit is provided for positioning an object carrier, together with an object situated thereon, in the object detection area, in particular down from the path conveyor unit. In particular, the positioning unit is provided for supplying the object carrier to the complementary counterpart of the object carrier unit and/or to the bearing unit. Due to the design according to the present invention of the detection device, positioning of an automatically transported object in the object detection area may advantageously be achieved in a reliable manner.

In addition, in accordance with an example embodiment of the present invention, the transport unit includes at least two object carriers. The transport unit preferably includes at least ten object carriers. Due to the design according to the present invention of the detection device, a dead time of the detection device due to a loading and unloading time of the transport unit may advantageously be minimized.

Furthermore, in accordance with an example embodiment of the present invention, a housing unit is provided for at least partially shielding an object detection area from the outside. The object data detection unit and the movement device are preferably at least partially situated in an inner space defined by the housing unit. The housing unit is provided in particular for shielding the inner space from dust. The housing unit preferably shields the inner space from electromagnetic radiation. The housing unit preferably includes an in particular single opening for positioning an object in the object detection area. The housing unit preferably includes a closure unit for in particular automatic closing and opening of the opening. Alternatively, the housing includes two openings for placing a path conveyor unit through the housing. The housing preferably includes a viewing window on the object detection area. The housing preferably includes a display unit, in particular a display. The display unit is in particular provided for depicting at least one element of a multiple object data set for inspection. Due to the design according to the present invention of the detection device, the detection device may be operated in dusty surroundings, in particular in manufacturing buildings and/or warehouses.

Moreover, in accordance with an example embodiment of the present invention, an anti-pollution unit is provided for at least reducing pollution of an object detection area and/or an area of an object data detection unit, in particular within the housing unit. An "anti-pollution unit" is understood in particular to mean a unit that at least reduces the number of particles, in particular dust, in a limited area and/or prevents penetration into the area. The anti-pollution unit may include a blower, for example, that generates a constant air flow out of the area to be protected. A blower preferably circulates air situated in the working area of the blower in order to generate an air flow. However, it is also possible for the blower to emit an in particular pure gas, for example nitrogen, from a supply unit. Alternatively or additionally, the anti-pollution unit may include an electrostatic unit, in particular an ionizer, to reduce adhesion of particles to a surface. Due to the design according to the present invention of the detection device, the detection device may be operated in dusty surroundings, in particular in manufacturing buildings and/or warehouses.

In addition, in accordance with an example embodiment of the present invention, the anti-pollution unit is provided for generating a positive pressure within the housing unit. A positive pressure is preferably achieved by circulating filtered air from the surroundings of the housing unit. Alternatively, an in particular pure gas is admitted from a supply unit into the housing unit. Due to the design according to the present invention of the detection device, it is possible to achieve a gas flow out of the housing unit.

Furthermore, in accordance with an example embodiment of the present invention, va preparation unit is provided for preparing, in particular cleaning, at least one object prior to an object data set detection.

Moreover, in accordance with an example embodiment of the present invention, the preparation unit includes a lock unit. A lock unit is understood in particular to mean a substructure of the housing unit that is delimited from the object detection area, and through which an object must pass for positioning in the object detection area. The substructure preferably includes a delimitation unit at a transition to the object detection area. The delimitation unit may include, for example, an automatically controlled sliding door or a curtain made of arranged elastic plastic lamellae. The lock unit preferably includes a further delimitation unit at an outer side of the substructure which is provided for inserting and/or removing an object into/from the lock unit. Due to the design according to the present invention of the detection device, a direct connection of the object detection area to the air surrounding the housing unit may be avoided, at least in a regular operating state of the detection device.

Furthermore, in accordance with an example embodiment of the present invention, the preparation unit includes a fluid control unit for controlling and/or regulating a fluid flow. In particular, a fluid control unit may include a blower, a gas nozzle, and/or a liquid nozzle. In particular, the fluid control unit is mounted at an outer wall of the housing unit. The fluid control unit is preferably situated around the opening of the housing unit. The fluid control unit preferably generates a fluid flow that is directed away from the opening. A fluid control unit is preferably situated in the lock unit. Due to the design according to the present invention of the detection device, a pollution of an object that is moved into the housing unit may be reduced.

In addition, in accordance with an example embodiment of the present invention, the detection device includes at least one contrast unit that is provided for an active illumination, in particular for illumination with the aid of an illumination unit of the detection device. A contrast unit is understood in particular to mean a unit which, viewed from the object data detection unit, is situated behind the object detection area and provides a uniform background during detection of the object. The contrast unit may have a curvature or may have a flat design. The contrast unit is preferably situated directly at the object carrier unit in at least one operating state of the detection device. However, it is also possible for the contrast unit to be movably supported relative to the object carrier unit, in particular movably supported together with the object data detection unit or relative to the object carrier unit and relative to the object data detection unit. An "active illumination" is understood in particular to mean that the contrast unit itself includes an illumination unit and/or that an illumination unit of the detection device, viewed from the object data detection unit, is situated behind the contrast unit and at least partially radiates through it. The contrast unit preferably includes at least one layer that diffusely scatters the light emanating from the illumination unit. The illumination unit may preferably emit light in various colors. The illumination unit preferably includes at least two illumination elements that are separately controllable. The illumination unit may preferably generate continuous light and/or a flash light. Alternatively, an illumination unit, viewed from the contrast unit, is situated opposite from the object carrier unit, in particular on the guide unit for the object data detection unit. In another embodiment of the present invention, the object detection area could be essentially completely enclosed by an illumination unit of the detection device. "Essentially completely enclosed" is understood in particular to mean that in an arrangement of the illumination unit on a surface of an imaginary three-dimensional body that completely encloses at least the object detection area, the illumination unit covers at least 50%, preferably more than 75%, of the surface. In particular, individual, in particular spaced-apart, individually controllable illumination elements may be situated on a surface of an imaginary three-dimensional body, which completely encloses at least the object detection area, in an irregular or regular, in particular grid-like, pattern. A subarea of the surface that results from a projection of a circular area onto the surface and on which no illumination element is situated is preferably at least less than 50%, preferably less than 25%. The illumination unit of the detection device is preferably designed in such a way that an object situated on the object carrier unit is illuminated from all sides, in particular in order to homogeneously illuminate the object. Alternatively or additionally, it is possible for the illumination unit to be provided for illuminating an object, situated on the object carrier unit, indirectly or at specific points. Alternatively or additionally, the illumination unit is provided for isolating an object, situated on the object carrier unit, as the result of a colored illumination. For example, it is possible to set a background behind the object in particular to blue, green, or some other color for isolation with the aid of the illumination unit, using a color recognition process beforehand. The color recognition process preferably takes place using a camera system, in particular via the object data detection unit or a mobile detection unit, in particular a color component in an object being computed and compared to a dimension of the object to allow a suitable color selection for isolating the object. The illumination unit of the detection device preferably includes a top view illumination unit and a front illumination unit. The top view illumination unit is preferably provided for illuminating an object, situated on the object carrier unit, from above. The front illumination unit is preferably provided for illuminating an object, situated on the object carrier unit, from the front, in particular along its circumference. The top view illumination unit and/or the front illumination unit preferably include(s) at least one illumination panel, in particular a plurality of illumination panels. The top view illumination unit and/or the front illumination unit preferably include(s) at least one individually movably supported illumination panel, in particular a plurality of individually movably supported illumination panels, in particular to allow setting of a light angle of the illumination unit relative to the object carrier unit. The illumination panels of the top view illumination unit and/or of the front illumination unit are preferably cascaded, in particular connected in succession and/or interlinked. The top view illumination unit and/or the front illumination unit are/is preferably controlled and/or regulated with the aid of the in particular central processing unit of the detection device or a system that includes the detection device. However, it is also possible for the top view illumination unit and/or the front illumination unit to include a dedicated processing unit, in particular a DMX controller, for individually controlling and/or regulating the illumination panel (s). The illumination unit, in particular the top view illumination unit and/or the front illumination unit, preferably include(s) at least one in particular passive cooling element. The cooling element preferably has a one-piece design with a carrier of the illumination panels, in particular as an extruded aluminum profile. Other embodiments of the cooling element are likewise possible, such as an embodiment of the cooling element as an active cooling element, in particular as a fluid cooling element (fan, water cooling element, etc.) or the like. At least one circuit board made of FR4 or a circuit board with an aluminum core of the illumination unit, in particular of the top view illumination unit and/or the front illumination unit, is preferably situated at the carrier, in particular for controlling and/or accommodating individual illumination elements of the illumination unit. The circuit board is preferably fixed at the carrier with the aid of a force-fit, form-fit, and/or integrally joined connection, for example with the aid of adhesion with QPad® Gap Filler II, with the aid of a screw connection, or the like. The circuit board preferably includes a topcoat that corresponds to a light color, in particular white. The circuit board preferably includes at least one copper strip conductor having a cross section of at least 70 µm.

The illumination unit preferably includes illumination elements designed as LEDs, in particular LED chips from the manufacturers Nichia and Seoul. However, it is also possible for the illumination elements to have some other design that appears meaningful to those skilled in the art. An RGB LED, for example a Nichia NSSM124DT RGB chip, and a white LED, for example a Seoul STW9C2PB-SC Sunlike chip, which in particular are situated together on a shared circuit board, preferably together form an illumination element of the illumination unit. The illumination element preferably has a color temperature of 5,000 K, and a color rendering index of at least 95. The illumination elements or the illumination panels are preferably uniformly situated in such a way that a low heat resistance is achievable and/or a high heat spread is achievable. The illumination unit preferably includes at least one optical diffuser element. The optical diffuser element is preferably situated at the circuit board, in particular at the illumination element. The optical diffuser element preferably has a maximum distance of less than 50 mm, in particular less than 30 mm, particularly preferably less than 20 mm, and particularly preferably less than 15 mm, from a surface of the circuit board or of the illumination panel, in particular to achieve an advantageous dispersion of the light from the illumination panels and/or to at least largely avoid hot spots and reflections.

The illumination unit preferably, in particular additionally, includes a background illumination unit that preferably includes at least one illumination panel, in particular a plurality of illumination panels, that is/are designed in particular analogously to the illumination panel(s) of the top view illumination unit and/or of the front illumination unit. The illumination panel(s) of the background illumination unit is/are preferably situated in a slight semicircle that includes a large diffuser disk. The background illumination unit is preferably individually controllable and/or regulatable with the aid of the in particular central processing unit of the detection device or a system that includes the detection device. However, it is also possible for the background illumination unit to include a dedicated processing unit, in particular a DMX controller, for individually controlling and/or regulating the illumination panel(s).

The illumination unit preferably includes at least one base illumination unit that is integrated into the object carrier unit. The base illumination unit is preferably provided for radiating through the object carrier unit, in particular for illuminating an object situated at the object carrier unit, from below. The base illumination unit is preferably individually controllable and/or regulatable with the aid of the in particular central processing unit of the detection device or a system that includes the detection device. However, it is also possible for the base illumination unit to include its own processing unit, in particular a DMX controller, for individually controlling and/or regulating the illumination panel (s). The base illumination unit preferably includes illumination elements or illumination panels having a design that is analogous to the illumination elements or the illumination panels of the top view illumination unit and/or the front illumination unit. The illumination elements are preferably uniformly distributed at the object carrier unit as groups, in particular with at least five illumination elements in a group. Heat dissipation of the base illumination unit preferably takes place via the object carrier unit, designed in particular as an aluminum platform, and/or a gap filler, in particular in the absence of an active fan. The object carrier unit preferably has a multilayer design. The object carrier unit preferably includes at least one coverage, and at least one object support that in particular encompasses the main extension surface. The coverage and at least one object support are preferably made of a translucent material, in particular a sheet acrylic resin composite such as Opal S302 Hi Macs®. A surface of the translucent material preferably has a ground design. The coverage and the at least one object support together form a maximum sheet thickness of the object carrier unit of at least 12 mm. The main extension surface of the object carrier unit preferably has a maximum distance of less than 50 mm, in particular less than 40 mm, and particularly preferably less than 30 mm, from the base illumination unit, in particular in a mounted state of the object carrier unit and of the base illumination unit. Voltage is preferably supplied to the illumination unit via in particular six power supply units, for example HEP600-20, 20V/28 A power supply units from Meanwell, which in particular are individually divided over a six-channel DMX controller, for example a 6CV10A-TS six-channel DMX controller. However, it is also possible for the illumination unit to be supplied with voltage in some other way that appears meaningful to those skilled in the art. The DMX controller is preferably provided for controlling the illumination element with a refresh rate of greater than 70 Hz, in particular to achieve a flicker-free light output of the illumination element. The illumination unit is preferably automatically adaptable to parameters of the object data detection unit with the aid of the DMX controller or the processing unit, depending on the design of the object data detection unit, in particular to adapt a setting of, for example, a refresh rate of the illumination unit to a refresh rate of the object data detection unit, preferably in order to at least largely avoid an image error such as flickering during a recording.

The DMX controller is preferably set to a maximum current limitation of 10 A. The DMX controller is preferably individually adapted to and coordinated with each illumination panel of the illumination unit that is connected to the DMX controller, an individual address being stored in the C-Bus system. All electronic components of the detection device preferably correspond to DIN EN 61347-2-13-2017-10. In particular, the illumination unit is tested for photobiological safety in accordance with EN 62471. Due to the design according to the present invention of the detection device, an illumination of the object may advantageously be adapted. In particular, a contrast of the contrast unit with respect to an object resting on the object carrier unit may be maximized via a color adjustment.

In addition, in accordance with an example embodiment of the present invention, the detection device includes at least one, in particular the above-mentioned, contrast unit, which includes at least one light source, in particular the background illumination unit. A light source is preferably mounted at the side of the contrast unit facing away from the object carrier unit. It is also possible for a light source to be embedded in the contrast unit. Furthermore, in accordance with an example embodiment of the present invention, a contrast unit that includes at least one light-emitting diode, in particular at least one organic light-emitting diode, is provided. In particular, the at least one light-emitting diode is provided for uniformly illuminating the contrast unit, in particular in various adjustable colors. Due to the design according to the present invention of the detection device, an illumination of the object may advantageously be adapted. In particular, a contrast of the contrast unit with respect to an object resting on the object carrier unit may be maximized via a color adjustment.

Moreover, in accordance with an example embodiment of the present invention, the detection device includes at least one, in particular the above-mentioned contrast unit, the movement device including a drive unit for an automated movement of the contrast unit. In particular, the drive unit is provided for moving the contrast unit around the object detection area on a movement path. The movement path of the contrast unit is preferably continuously connected to the movement path of the object data detection unit. Alternatively, the movement path of the contrast unit, at least in sections, extends essentially in parallel to a movement path of the object detection unit. "Essentially parallel" is understood here in particular to mean an orientation of a direction relative to a reference direction, in particular in a plane, the direction having a deviation from the reference direction that is in particular less than 8°, advantageously less than 5°, and particularly advantageously less than 2°. It is also possible for the movement path of the contrast unit to have a design that is independent of the movement path of the object detection unit. In particular, "automated" is understood to mean that the drive unit is controlled and/or regulated via an in particular central processing unit. In particular, the processing unit controls and/or regulates the drive unit based on a list of in particular predetermined perspectives from which the object is to be detected. Due to the design according to the present invention of the detection device, a background may advantageously be adapted, in particular to a position of the object data detection unit.

In accordance with an example embodiment of the present invention, the detection device includes the object data detection unit and at least one, in particular the above-mentioned, contrast unit, the movement device including a movement unit that is provided for simultaneously moving the contrast unit and the object data detection unit. "Simultaneously moving" is understood in particular to mean that the contrast unit and the object data detection unit, at least after completion of the movement, have the same relative position and the same relative orientation with respect to one another as before the movement. The movement of the contrast unit and the movement of the object data detection unit may be carried out concurrently or in succession. It is also possible to maintain the same relative position and the same relative orientation with respect to one another while the overall movement is maintained. In particular, the contrast unit and the object data detection unit have a shared swivel axis and/or rotational axis about which the object data detection unit and the contrast unit are swiveably and/or rotatably supported. It is possible for the movement unit to be designed as a multiaxial robotic arm at which the object data detection unit and the contrast unit are situated together. In addition, it is also possible for the movement unit to be designed as a rail unit at which the object data detection unit and the contrast unit are situated together. The object data detection unit and the contrast unit may be situated together at a single movement element of the movement unit, for example at a movably supported guide carriage, or the object data detection unit and the contrast unit may each be situated at a separate movement element of the movement unit, for example at a separate guide carriage. Further embodiments and/or arrangements of the contrast unit that appear meaningful to those skilled in the art are likewise possible. Due to the design according to the present invention of the detection device, a constant background may advantageously be provided, regardless of the relative position of the object and the object data detection unit.

Moreover, in accordance with an example embodiment of the present invention, the detection device includes the object data detection unit and at least one, in particular the above-mentioned, contrast unit, the movement unit including a structural unit which in at least one operating state essentially rigidly connects the contrast unit and the object data detection unit to one another. "Essentially rigidly" is understood in particular to mean that a relative position and a relative orientation of the contrast unit and of the object data detection unit with respect to one another are maintained, at least under a force exerted by the drive unit and/or a torque exerted by the drive unit. The structural unit is preferably designed as a shared guide carriage. Alternatively or additionally, the structural unit includes at least one, preferably two, coupling rods that connect the movement unit of the object data detection unit and the movement unit of the contrast unit to one another. Due to the design according to the present invention of the detection device, it may advantageously be ensured in a simple and reliable manner that the contrast unit and the object data detection unit simultaneously move relative to one another.

Furthermore, in accordance with an example embodiment of the present invention, a control and/or regulation unit is provided for setting at least one operating parameter of the detection device as a function of at least one object parameter. In particular, the control and/or regulation unit is provided for individually and continuously coordinating all motion sequences that are allowed by the movement device, based on the operating parameters. An object parameter is in particular an individual piece of information concerning an object and/or an instruction for an object. The information and/or instruction may be a function of the object itself and/or may be provided based on the situation. An object parameter may be designed, for example, as a maximum extension of the object, as a weight, as a relative arrangement on the object carrier unit, and/or as a degree of pollution. An operating parameter of the detection device includes, for example, the perspectives to be used, the number of pieces of object data included in a multiple object data set, the rotational speed of the object carrier unit, the activation of the preparation unit, the speed of the transport unit, the intensity of an air blower, and/or some other parameter that appears meaningful to those skilled in the art that may be adapted for reliably detecting a multiple object data set. Due to the design according to the present invention of the detection device, a reliable detection of a multiple object data set may advantageously be achieved. In particular, the detection device may be quickly and reliably adapted to objects having various object parameters.

Moreover, in accordance with an example embodiment of the present invention, an identification unit for an advance detection of at least one object parameter is provided. The identification unit preferably includes a scanning unit for reading in an object parameter. The object parameter is preferably designed as a unique identification number, for example as an EAN. The identification number is preferably stored in an identification element, for example as a barcode, QR code, and/or RFID tag. The identification number is preferably read in during loading of the transport unit and/or during positioning of the object in the object detection area. Further object parameters, for example dimensions and/or weight, may preferably be retrieved from a database, based on the identification number. The identification number is preferably unique. Alternatively, the identification number assigns an object to a certain category of objects having similar further object parameters. The scanning unit is preferably a handheld scanner. In another embodiment of the present invention, the scanning unit could also be integrated into the object carrier, the transport unit, and/or the lock unit, in particular for an automated detection of an object parameter. The identification element is preferably situated at the object and/or integrated into the object. However, it is also possible for the identification feature to be physically separate from the object, for example on a package and/or a data sheet. Due to the design according to the present invention of the detection device, operating parameters of the detection device may be quickly adapted to different objects. Detected multiple object data sets may advantageously be associated with an object in a reliable manner.

In addition, in accordance with an example embodiment of the present invention, an identification unit for an advance detection of at least one object parameter is provided. The identification unit preferably includes a scanning unit for reading in an object parameter. The object parameter is preferably designed as a unique identification number. The identification number is preferably stored in an identification element, for example as a barcode, QR code, and/or RFID tag. The identification number is preferably read in during loading of the transport unit and/or during positioning of the object on the object carrier. The identification unit preferably includes a further scanning unit for reading in the identification number immediately before positioning the object carrier in the object detection area. The identification number is preferably unique. In particular, the identification number involves consecutive numbering. The scanning unit is preferably a handheld scanner. The further scanning unit preferably has an automated design. Due to the design according to the present invention of the detection device, operating parameters of the detection device may be quickly adapted to different objects.

Furthermore, in accordance with an example embodiment of the present invention, the identification unit is provided for evaluating an object carrier parameter with regard to an object parameter. The identification unit preferably includes a scanning unit that allows an object parameter, in particular an identification number, and an object carrier parameter, in particular an identification number, to be read in. In the identification unit, an object carrier parameter is preferably associated with an object based on an object parameter. Further object parameters, for example dimensions and/or weight, may preferably be retrieved from a database, based on the object carrier parameter. Due to the design according to the present invention of the detection device, an advance detection of object parameters may be easily ensured, in particular for objects having very different object parameters.

Moreover, in accordance with an example embodiment of the present invention, a communication device for receiving object parameters is provided. In particular, the detection device includes an interface for communicating with storage and/or logistics software in order to quickly and reliably receive and/or compare object parameters. Due to the design according to the present invention of the detection device, misassignments may be recognized.

In addition, in accordance with an example embodiment of the present invention, the object carrier unit includes a weight detection unit. A "weight detection unit" is understood in particular to mean a unit that may detect at least a weight, preferably a mass, of an object. The weight detection unit may be embedded in the object carrier as a pressure plate, for example. Alternatively, the weight detection unit detects a weight via the forces and/or torques on the bearing unit. Due to the design according to the present invention of the detection device, a multiple object data set may also contain a piece of information concerning the weight of the detected object.

Furthermore, in accordance with an example embodiment of the present invention, a dimension detection unit is provided. A "dimension detection unit" is understood in particular to mean a unit that may detect at least one extension of an object. The dimension detection unit preferably includes a movably supported laser module for a time-of-flight measurement. The laser module may be connected in a form-fit and or force-fit manner to the movement unit of the object data detection unit and/or to the contrast unit. Alternatively, the movement device includes a laser module movement unit for moving the laser module independently from the object data detection unit. The laser module movement unit preferably includes a guide carriage. The guide carriage is preferably situated at the guide unit of the object data detection device and/or at the guide unit of the contrast unit. Alternatively, the laser module movement unit includes a movement path that is independent of the object data detection device and/or the contrast unit. In one alternative embodiment, an extension of an object is computed with a processing unit, based on the multiple object data set detected with the object data detection unit, and motion data of the object carrier unit, in particular a rotational speed, using a structure-from-motion method. It is also possible for the dimension detection unit to include an illumination unit and a detection unit in order to obtain an extension from a transmitted light method and/or incident light method. It is also possible for multiple methods to be combined with one another. Due to the design according to the present invention of the detection device, a multiple object data set may also contain a piece of information concerning the dimensions of the detected object.

In addition, in accordance with an example embodiment of the present invention, a permeation unit, in particular an X-ray unit, is provided which is provided for at least partially permeating at least one object. The permeation unit preferably includes at least one X-ray unit and an X-ray screen. Alternatively and/or additionally, the permeation unit includes an ultrasonic unit. The permeation unit may be connected in a form-fit and/or force-fit manner to the movement unit of the object data detection unit and/or to the contrast unit. Alternatively, the movement device includes an irradiation movement unit for moving the permeation unit independently from the object data detection unit and/or the contrast unit. The irradiation movement unit preferably includes a guide carriage. The guide carriage is preferably situated at the guide unit of the object data detection device and/or on the guide unit of the contrast unit. Alternatively, the irradiation movement unit includes a movement path that is independent of the object data detection device and/or the contrast unit. It is also possible for the irradiation movement unit to be immovable. Due to the design according to the present invention of the detection device, a multiple object data set may also contain a piece of information concerning the internal structure of an object. In particular, it may be recognized whether the object is hollow or solid. In addition, a density may be deduced using data on the dimensions.

Furthermore, in accordance with an example embodiment of the present invention, a system is provided that includes a detection device according to the present invention, including a memory unit with data sets that are at least partially generated using the detection device, and including a mobile detection unit and a processing unit that is provided for evaluating data that are detected with the mobile detection unit, at least taking the memory unit into account. The memory unit is preferably provided for at least temporarily storing multiple object data sets. The object data sets of detected objects generated with the aid of the system or with the aid of the detection device preferably include information concerning a setting of the detection device made during the detection, a dimension of the object, a weight of the object, a bounding box of the object, a volume model of the object, 3D data of the object, color profiling of the detection device, or other data that appear meaningful to those skilled in the art. The object data sets of detected objects are preferably stored in the image files of the detected objects as so-called metadata, in particular according to the exchangeable image file format (Exif). However, it is also possible for the object data sets of detected objects to be stored in some other way, for example in a separate file format, as electronic watermarks, separate from the image file in a database, or the like. It is possible for the detection device or the system that includes the detection device to include one or multiple scales, with the aid of which at least one parameter designed as a weight is detectable. The one or multiple scale(s) is/are preferably at least data-linked to the processing unit. The memory unit is particularly preferably provided for storing data sets that have been at least partially generated using the detection device. The memory unit is preferably physically separate from the detection device. The processing unit is provided for carrying out an object learning process. An "object learning process" is understood in particular to mean processing of the multiple object data sets for further use. For example, an object learning process may include the creation of a 360-degree view of the object, the creation of a three-dimensional model of the object, and/or the extraction of characteristic features, in particular for allowing pattern recognition. The multiple data sets generated by the detection device are preferably processed to form data sets that have been at least partially generated using the detection device. "At least partially generated using the detection device" is understood in particular to mean that at least one further piece of information is used for processing a multiple data set. The further piece of information is preferably a further multiple data set of a further object that may be classified in the same category as the object, at least with regard to the type of object data. A "mobile detection unit" is understood in particular to mean that the mobile detection unit in a designated operating state is carryable by hand, and in particular is operable in a portable manner. The mobile input unit is preferably wearable by a person directly or indirectly on the body, for example as a bracelet and/or in a pocket of a garment. For example, the mobile input unit may be designed as a smart phone, a tablet, a smart watch, and/or as a peripheral head-mounted display (PHMD). The mobile detection unit is provided in particular for detecting object data. In addition, the mobile input unit includes a communication unit for communicating with the processing unit. The processing unit is provided for identifying the object, based on the object data detected by the mobile detection unit, taking into account the data sets stored in the memory unit. It is also possible for the processing unit to be provided for identifying the object, based on the multiple object data sets detected by the detection device, taking into account the data sets stored in the memory unit. Due to the design according to the present invention of the system, a database may be created that allows identification of an object using simple means. In particular, additional information concerning the object may be directly retrieved.

Moreover, in accordance with an example embodiment of the present invention, a method for detecting multiple object data sets of at least one object, using a detection device according to the present invention and/or a system according to the present invention, is provided.

In addition, in accordance with an example embodiment of the present invention, at least one parameter, in particular a movement parameter and/or a position parameter, of a contrast unit of the detection device is changed in at least one method step of the method according to the present invention as a function of a parameter of an object to be detected, of a parameter of the object data detection unit, and/or of a parameter of an illumination unit of the detection device. A parameter, in particular a movement parameter and/or a position parameter, of the contrast unit is preferably changed in at least one method step as a function of a parameter of an object to be detected that is designed as a dimension, in particular as a size, as a cast shadow, or the like, in particular due to a movement of the contrast unit relative to the object to be detected, with the aid of the movement device. A parameter, in particular a movement parameter and/or a position parameter, of the contrast unit is preferably changed in at least one method step as a function of a parameter of the object data detection unit, designed in particular as a camera, that is designed as a focal length, as a focus, as an exposure time, or the like, in particular due to a movement of the contrast unit relative to the object data detection unit with the aid of the movement device. A parameter, in particular a movement parameter and/or a position parameter, of the contrast unit is preferably changed in at least one method step as a function of a parameter of the illumination unit designed as an illumination intensity, a brightness, or the like, in particular due to a movement of the contrast unit relative to the illumination unit with the aid of the movement device. With the aid of the design according to the present invention, an advantageous positioning and/or movement of the contrast unit for an accurate detection of image data of an object may be achieved.

In addition, in accordance with an example embodiment of the present invention, a method using a detection device according to the present invention and/or a system according to the present invention is provided in which at least one multiple data set is collected in at least one method step during a backward movement of the movement device, after a forward movement, back into a starting position of the movement device. The movement device and the object data detection unit are preferably controlled and/or regulated by an in particular central processing unit. In particular, the processing unit controls and/or regulates the defined relative movement and at least the detection point in time of the object data detection unit. The movement device preferably has a defined starting position from which a defined relative movement starts. A "forward movement" is understood in particular to mean a movement that leads away from the starting position. A "backward movement" is understood in particular to mean a movement that leads toward the starting position. A backward movement may be achieved by reversing the movement path during the forward movement, or by continuing to move along a closed movement path. Due to the design according to the present invention of the detection device, a dead time of the machine between two detections of various multiple object data sets for returning to the starting position of the movement device may advantageously be minimized.

Furthermore, in accordance with an example embodiment of the present invention, a method using a detection device according to the present invention and/or a system according to the present invention is provided in which a material is deduced from at least one data set in at least one method step. The processing unit preferably deduces a material at least from the color and weight of the object by comparison with a database. For a material recognition, dimensions of the object, in particular information concerning the density, are/is preferably used. It is possible to collect further data regarding a material of the object via laser spectroscopy, for example. Due to the design according to the present invention of the method, in particular identical-looking objects may be distinguished from one another.

In addition, in accordance with an example embodiment of the present invention, a method using a system according to the present invention is provided in which the created object data sets are evaluated in at least one method step for machine learning, in particular using a neural network. Moreover, in accordance with an example embodiment of the present invention, a method using a system according to the present invention is provided in which the created object data sets are evaluated in at least one method step for recognizing the object. Furthermore, in accordance with an example embodiment of the present invention, a method using a system according to the present invention is provided in which the data detected using the mobile detection unit are evaluated in at least one method step for recognizing the object. Due to the design according to the present invention of the method, in particular rapid and reliable identification of a detected object may be achieved.

The detection device according to the present invention, the system according to the present invention, and/or the method according to the present invention are/is not to be limited to the application and specific embodiments described above. In particular, for implementing an operating principle described herein, the detection device according to the present invention/the system according to the present invention and/or the method according to the present invention may include a number of individual elements, components, and units as well as method steps that is different from a number stated herein. In addition, for the value ranges given in the present disclosure, values within the stated limits are also considered to be disclosed and usable as desired.

BRIEF DESCRIPTION OF THE DRAWINGS

Further advantages result from the description below of the figures. Eight exemplary embodiments of the present invention are illustrated in the figures. The figures and the description herein contain numerous features in combination. Those skilled in the art will also advantageously consider the features individually and combine them into further meaningful combinations.

DETAILED DESCRIPTION OF EXAMPLE EMBODIMENTS

Figure 1:
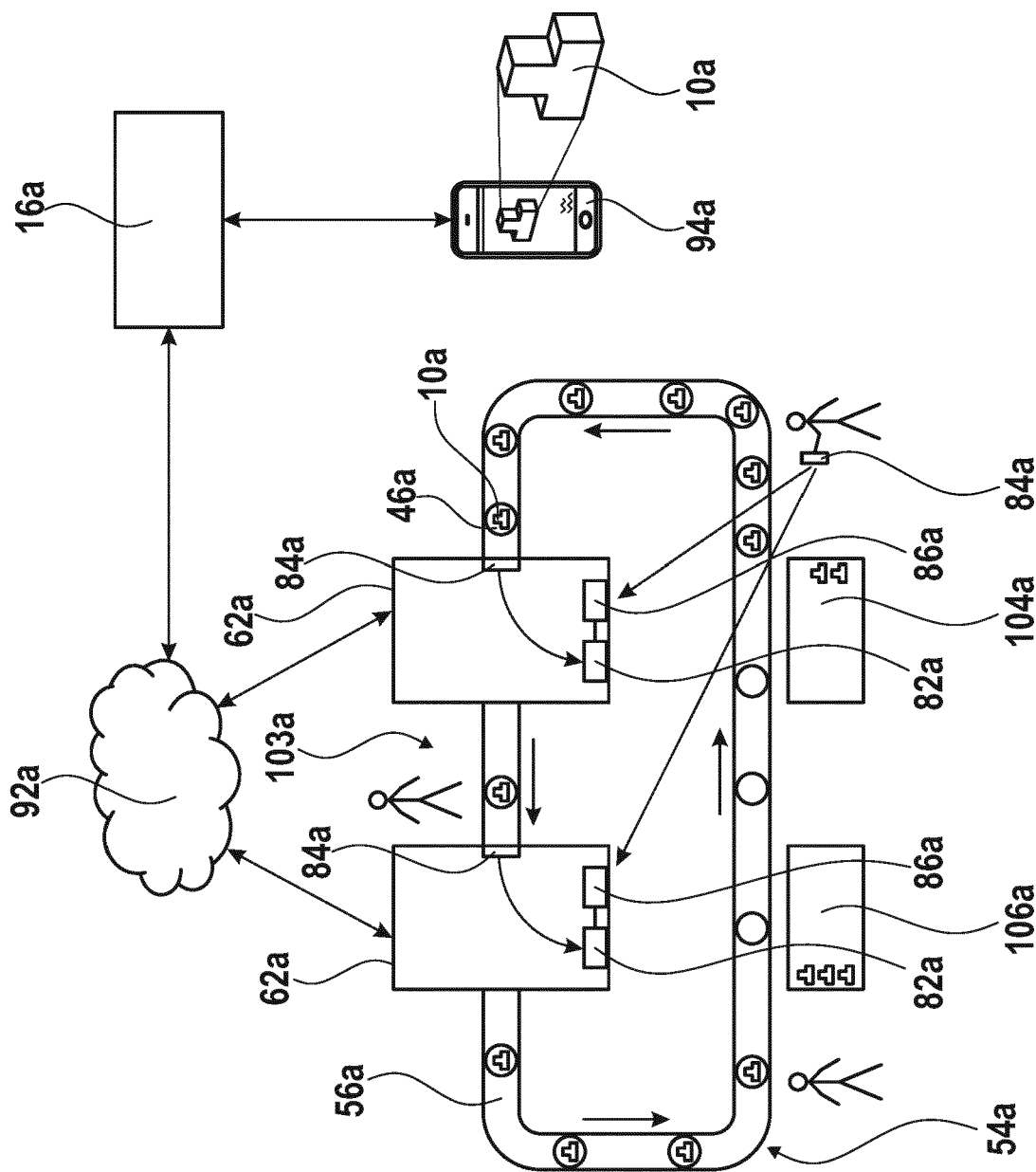
FIG. 1 shows a schematic illustration of the system according to the present invention for nontransparent object carriers.

FIG. 1 shows a system that includes a detection device with a memory unit 92a including data sets that are at least partially generated using the detection device, and including a mobile detection unit 94a and a processing unit 16a that is provided for evaluating data that are detected with mobile detection unit 94a, at least taking memory unit 92a into account. The detection device includes a processing unit 16a that is provided for carrying out an object learning process.

The detection device includes a housing unit 62a that is provided for at least partially shielding an object detection area from the outside. The detection device includes a transport unit 54a that is provided for supplying objects 10a to the object detection area in an at least partially automated manner. Transport unit 54a includes a path conveyor unit 56a, in particular a conveyor belt unit. Transport unit 54a is provided for transporting at least two detachably connected object carriers 46a. Transport unit 54a preferably transports a plurality of object carriers 46a, an illustrated number of object carriers 46a preferably being strictly by way of example. In particular, object carriers 46a are each loaded with one object 10a in a loading area 104a. Objects 10a, after a detection in object detection areas enclosed by housing units 62a, are preferably removed from object carriers 46a in an unloading area 106a. The loading and/or unloading take(s) place manually, for example, in particular by an operator. In another embodiment, the loading and/or unloading of transport unit 54a may also take place in particular automatically with the aid of a logistics and conveying system, in particular with the aid of a robot.

The detection device includes an identification unit 84a for an advance detection of object parameters. The detection device includes an identification unit 84a for an advance detection of object carrier parameters. In particular, each identification unit 84a includes a scanning unit that is situated at housing units 62a. Identification unit 84a preferably includes a mobile scanning unit. The mobile scanning unit is provided in particular for detecting an object parameter as well as an object carrier parameter. In particular, the mobile scanning unit reads in an identification number of object carrier 46a during loading of object carrier 46a. Beforehand or afterward, the mobile scanning unit preferably reads in an identification number of object 10a. However, it would also be possible for an identification number of object 10a to be manually associated with the identification number of object carrier 46a and merely queried by the scanning unit. Object parameters are preferably queried by an internal and/or external database, based on the identification number of object 10a. The detection device includes a communication device 86a for receiving object parameters. In particular, in addition to the object parameters, communication device 86a receives the identification number of object carrier 46a which carries associated object 10a. Path conveyor unit 56a preferably transports object 10a on object carrier 46a after reading in the identification numbers to the first object data detection area. Identification unit 84a is provided for evaluating an object carrier parameter with regard to an object parameter. In particular, the scanning unit situated at housing unit 62a detects the identification number of object carrier 46a upon entry into the inner space of housing unit 62a. In particular, the object parameters received by communication device 86a are selected based on the identification number of object carrier 46a. The detection device includes a control and/or regulation unit 82a that is provided for setting at least one operating parameter of the detection device as a function of at least one object parameter.

In one embodiment including nontransparent object carriers 46a, for detecting the side of an object 10a resting on object carrier 46a, the object must be turned 103a at least once. To achieve higher throughput rates, the system includes a further object detection area that is provided for carrying out an additional detection of object 10a after object 10a is turned 103a. The object detection areas in particular have an identical design. However, it would also be possible for a second object detection area to have a reduced functionality compared to the first object detection area.

Figure 2:
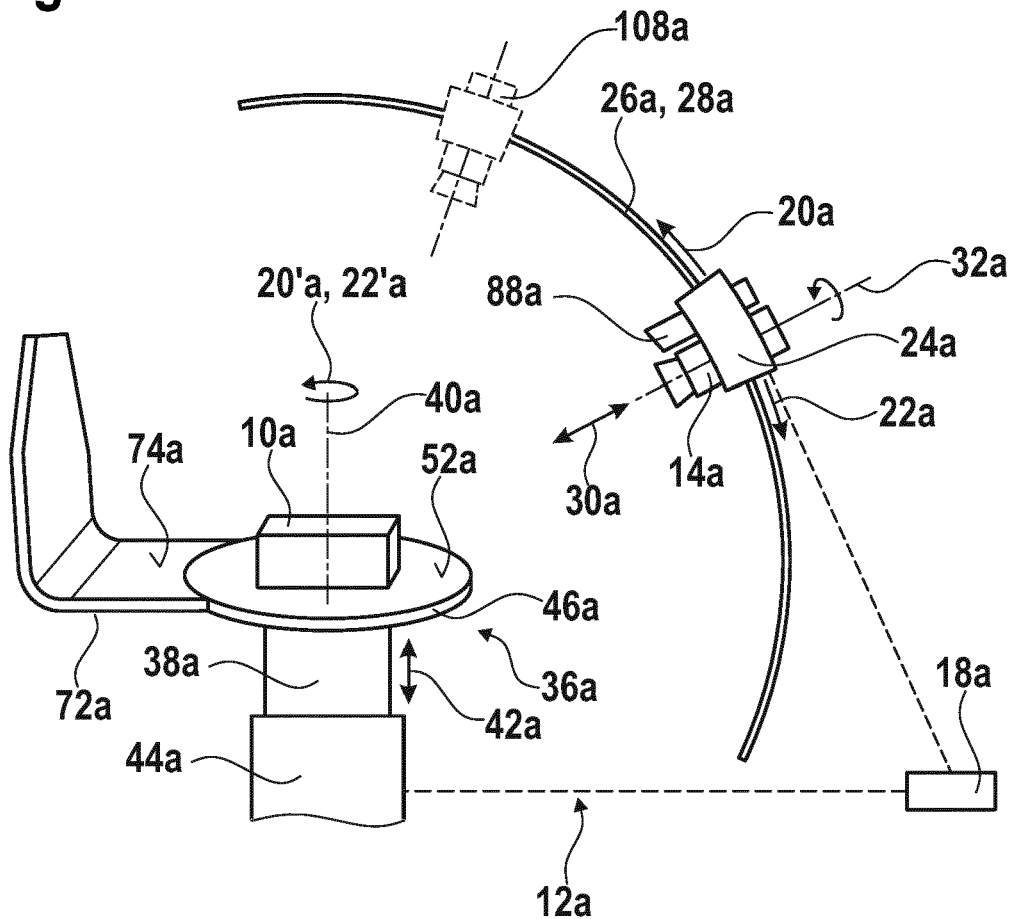
FIG. 2 shows a schematic illustration of the movement device, including a nontransparent object carrier.

FIG. 2 shows the detection device for an at least semi-automated detection of multiple object data sets at least of object 10a, including a movement device 12a for generating a defined relative movement between at least one object data detection unit 14a and the at least one object 10a. Movement device 12a is provided for detecting object data from multiple perspectives.

Movement device 12a includes at least one movement unit 24a for a defined movement of the at least one object data detection unit 14a. Movement unit 24a is provided for guiding the at least one object data detection unit 14a on an at least partially curved movement path 26a. Movement unit 24a includes at least one partially curved path 28a, and is provided for guiding the at least one object data detection unit 14a along at least partially curved path 28a. It is possible to use multiple object data detection units 14a. A further object data detection unit 108a is indicated in FIG. 2. In particular, each object data detection unit 14a, 108a could cover a subsection of curved path 28a for quicker detection of object data from multiple perspectives. In particular, object data detection units 14a, 108a could be moved simultaneously or independently of one another. Movement unit 24a is provided for guiding the at least one object data detection unit 14a along a direction 30a that is at least essentially perpendicular to a movement path 26a. Object data detection unit 14a has at least one swivel axis and/or rotational axis 32a about which object data detection unit 14a is swivelably and/or rotatably supported. The detection device includes a dimension detection unit 88a. Dimension detection unit 88a is preferably designed as a laser module. Dimension detection unit 88a is preferably mounted on a guide carriage of movement unit 24a that is shared with object data detection unit 14a.

The detection device includes an object carrier unit 36a. Movement device 12a includes a bearing unit 38a via which object carrier unit 36a is movably supported. Bearing unit 38a has at least one swivel axis and/or rotational axis 40a about which object carrier unit 36a is swivelably and/or rotatably supported. Bearing unit 38a includes at least one movement path 42a along which object carrier unit 36a is movably supported. Object carrier unit 36a is preferably movably supported, in particular rotatably supported, relative to object data detection unit 14a via bearing unit 38a. Movement device 12a includes a drive unit 44a that is provided for automatedly moving object carrier unit 36a. Movement device 12a preferably includes drive unit 44a, that is provided for moving object carrier unit 36a and moving object data detection unit 14a opposite one another, in particular opposite one another about swivel axis and/or rotational axis 40a of bearing unit 38a.

Object carrier unit 36a is provided for an active illumination. Object carrier unit 36a includes at least one light source 52a. Object carrier unit 36a includes at least one light-emitting diode (LED), in particular at least one organic light-emitting diode (OLED). Light source 52a preferably includes an OLED screen that is flatly situated on object carrier 46a. The object carrier unit preferably includes at least one transparent protective layer for protecting light source 52a.

Object carrier unit 36a includes a weight detection unit. Object carrier unit 36a includes at least one detachably connected object carrier 46a. Object carrier 46a is preferably raised from path conveyor unit 56a by bearing unit 38a (see FIG. 1) for detecting object data. After object data are detected, object carrier 46a is preferably lowered onto path conveyor unit 56a with the aid of bearing unit 38a. For raising and lowering object carrier 46a, path conveyor unit 56a preferably includes a corresponding recess through which bearing unit 38a may be temporarily connected to object carrier 46a in a form-fit and/or force-fit manner.

The detection device includes a processing unit 18a that is provided for utilizing a forward movement 20a, 20'a and a backward movement 22a, 22'a of an object data detection unit 14a and/or of an object 10a for data detection.

The detection device includes a contrast unit 72a that is provided for an active illumination. The detection device includes a contrast unit 72a that includes at least one light source 74a. The detection device includes a contrast unit 72a that includes at least one light-emitting diode, in particular at least one organic light-emitting diode. Contrast unit 72a is preferably situated on object carrier unit 36a in at least one operating state. However, it is also possible for contrast unit 72a to be movably supported relative to object carrier unit 36a, in particular movably supported together with object data detection unit 14a or relative to object carrier unit 36a and relative to object data detection unit 14a. Light source 74a preferably includes an OLED screen that is flatly situated at contrast unit 72a.

Figure 3:
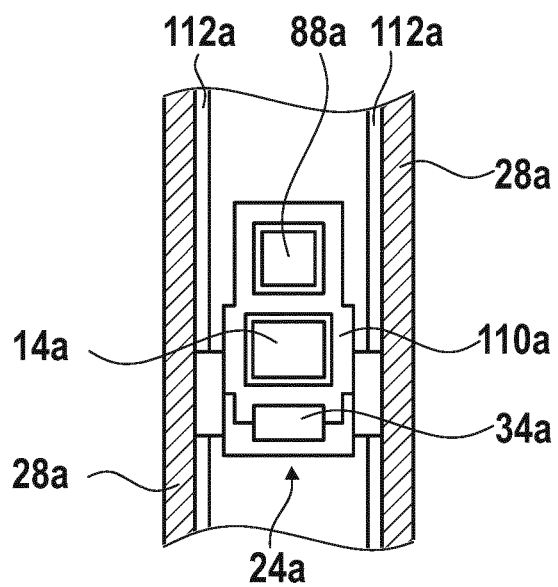
FIG. 3 shows a schematic illustration of the movement unit of the object detection unit.

FIG. 3 shows one possible embodiment of movement unit 24a. Movement unit 24a includes a drive unit 34a that is provided for automatedly moving object data detection unit 14a. In particular, movement unit 24a includes a guide carriage on which object data detection unit 14a is mounted. Curved path 28a is preferably designed as a guide rail that includes a guide 112a. In particular, curved path 28a includes two paths extending in parallel. The guide carriage is preferably situated between the parallel paths.

Figure 12:
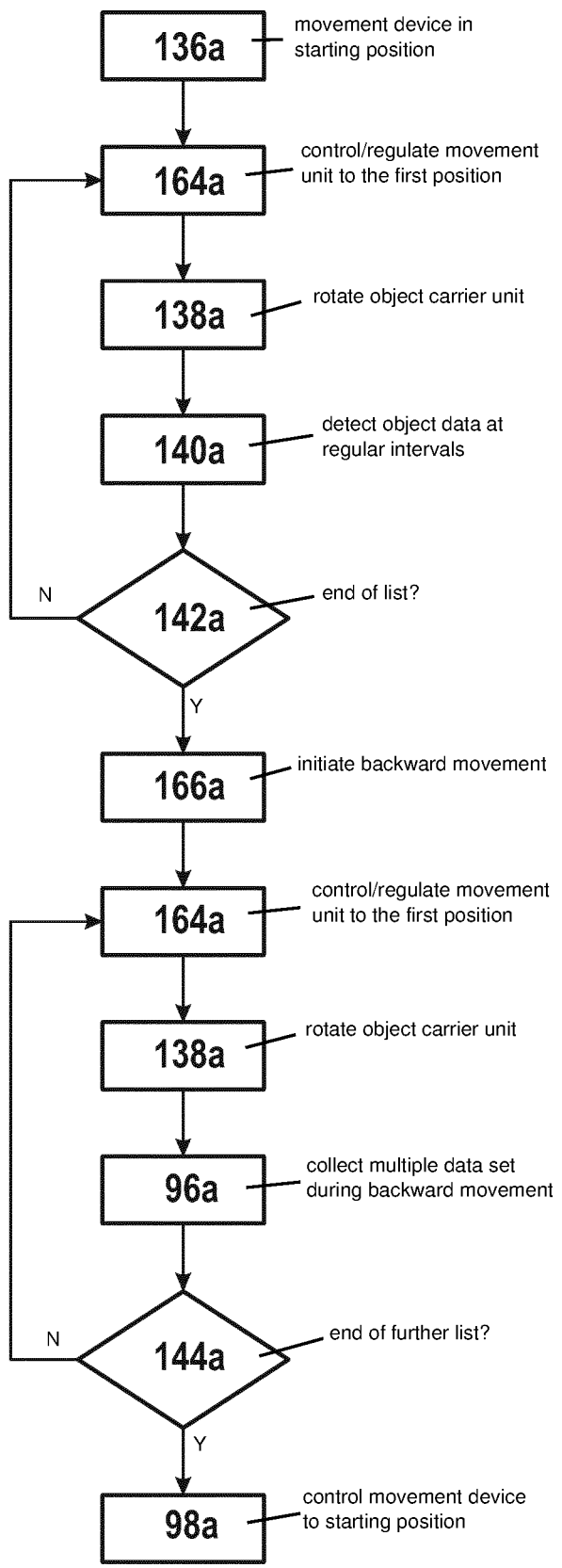
FIG. 12 shows a schematic illustration of the method for detecting a multiple object data set.
Figure 13:
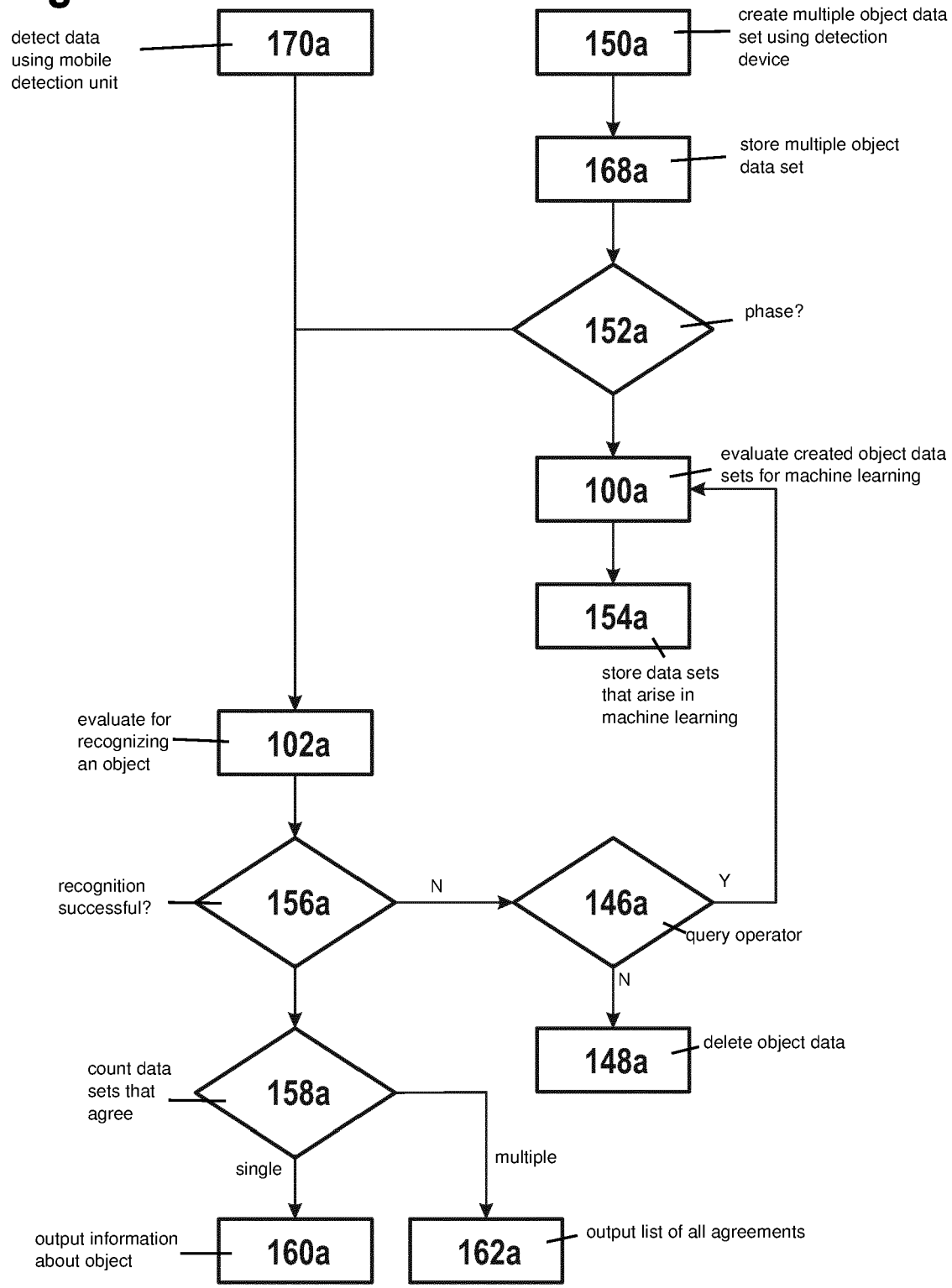
FIG. 13 shows a schematic illustration of the method for recognizing objects.

FIGS. 12 and 13 each show a method that includes a detection device according to the present invention and/or a system according to the present invention.

FIG. 12 shows a schematic illustration of the method for detecting a multiple object data set. In an initial phase 136a it is preferably ensured that movement device 12a is in an designated starting position 98a. Operating parameters at least for movement device 12a and object data detection unit 14a are preferably automatically established with the aid of control and/or regulation unit 82a, in particular based on an advance detection of object parameters. In particular, a list containing positions for object carrier unit 36a and object data detection unit 14a is created for which a detection of object data takes place with the aid of object data detection unit 14a. Movement unit 24a of object data detection unit 14a is preferably controlled and/or regulated to the first position in a further method step 164a. Object carrier unit 36a is preferably driven in uniform rotation 138a about rotational axis and/or swivel axis 40a with the aid of drive unit 44a in a further method step or while movement unit 24a is being moved to a new position. Object data are preferably detected with object data detection unit 14a at regular intervals, for example every 10° of the rotational movement of object carrier unit 36a, in a further method step 140a. In particular, the individual detections may be triggered with the aid of a rotational path sensor, for example, or may take place at regular time intervals that are coordinated with a rotational speed of object carrier unit 36a. At least one parameter, in particular a movement parameter and/or a position parameter, of contrast unit 72a are/is preferably changed in at least one method step as a function of a parameter of object to be detected 10a, of a parameter of object data detection unit 14a, and/or of a parameter of an illumination unit of the detection device. A parameter, in particular a movement parameter and/or a position parameter, of contrast unit 72a are/is preferably changed in at least one method step as a function of a parameter of object to be detected 10a that is designed as a dimension, in particular as a size, as a cast shadow, or the like, in particular due to a movement of contrast unit 72a relative to object to be detected 10a with the aid of movement device 12a. A parameter, in particular a movement parameter and/or a position parameter, of contrast unit 72a is preferably changed in at least one method step as a function of a parameter of object data detection unit 14a, designed in particular as a camera, that is designed as a focal length, as a focus, as an exposure time, or the like, in particular due to a movement of contrast unit 72a relative to object data detection unit 14a with the aid of movement device 12a. A parameter, in particular a movement parameter and/or a position parameter, of contrast unit 72a is preferably changed in at least one method step as a function of a parameter of the illumination unit that is designed as an illumination intensity, a brightness, or the like, in particular due to a movement of contrast unit 72a relative to the illumination unit with the aid of movement device 12a. After an in particular complete revolution of object carrier unit 36a, a check 142a is preferably made in a further method step as to whether an end of the list containing positions is reached. In the event of a negative result of check 142a, movement unit 24a of object data detection unit 14a is preferably controlled and/or regulated to the next position. In the event of a positive result of check 142a, a backward movement 22a is initiated in a further method step 166a. In the method, at least one multiple data set is collected in at least one method step 96a during a backward movement 22a of movement device 12a, after a forward movement 20a, back into a starting position 98a of movement device 12a. In particular, a further list containing positions for a backward movement 22a is dealt with analogously. If an end of the further list containing positions is reached in a corresponding further check 144a, movement device 12a is preferably controlled into starting position 98a. At least one list preferably contains standard positions, for example 0°, 45°, and 90° with respect to starting position 98a for a circular path of the object data detection unit. At least one list preferably contains object-specific positions. It is also possible for all positions in which a detection takes place to be uniformly distributed over all lists. In particular after the detection of a data set in method step 96a, 140a, rotation 138a may be stopped, or continuously maintained until movement device 12a returns into starting position 98a.

FIG. 13 shows a schematic illustration of the method for recognizing an object 10a. In particular, FIG. 13 shows a method that includes a system according to the present invention in which the created object data sets are evaluated for machine learning 100a in at least one method step. A distinction is preferably made between two phases. In particular, a distinction is made between a learning phase and a recognition phase. A check 152a is preferably carried out in at least one method step concerning in which phase the method is in. At least one multiple object data set of at least one object 10a is preferably detected, using the detection device, in a first method step 150a. Object carrier unit 36a and object data detection unit 14a in at least one method step are preferably moved oppositely from one another, in particular about swivel axis and/or rotational axis 40a of bearing unit 38a of movement device 12a, in particular to detect a multiple object data set of at least one object 10a with the aid of the detection device. The multiple object data set is preferably stored in memory unit 92a in a further method step 168a. In the learning phase, the created object data sets are preferably evaluated for machine learning 100a in at least one method step. The data sets that arise in machine learning 100a are preferably stored in memory unit 92a in a further method step 154a. In particular, the original multiple object data sets may be deleted in method step 154a. The system for recognizing previously detected objects 10a may preferably be utilized after completion of the learning phase. Object data concerning an object 10a to be recognized are preferably detected using a mobile detection unit 94a. Alternatively, the detection device is utilized for detecting object data in method step 150a. The object data are preferably supplied to processing unit 16a. In the method, the created object data sets are evaluated for recognizing 102a object 10a in at least one method step. In the method, the data detected using mobile detection unit 94a are evaluated for recognizing 102a object 10a in at least one method step. In particular, a check is made as to whether the object data sets created in method step 150a using the detection device and/or the data detected in method step 170a using mobile detection unit 94a at least partially agree with the data sets created in the learning phase after an evaluation by processing unit 16a. Two data sets preferably partially agree when one data set is a subset of the other. A check is preferably made in a further method step 156a as to whether recognition 102a was successful, in particular whether at least one agreement could be found. If it was not possible to bring the detected object data into agreement with a previously detected object, a decision 146a of an operator is queried in an optional step as to whether the detected object data are to be used for machine learning 100a in order to expand the list of recognizable objects and/or to modify the data set, stored in the memory unit, for an object that is already known. In the event of a negative decision 146a, the object data are preferably deleted in a subsequent method step 148a. After a successful recognition 102a, a count 158a of the data sets that agree with the detected data is preferably carried out in a further method step. In the event of a single partial agreement in a final method step 160a, a piece of information concerning the object in question, for example a name, an identification number, and/or an order number, is preferably output. For multiple objects in question, a list of all agreements is preferably output in a method step 162a. A piece of information is preferably output, on the basis of which the objects may be distinguished. In the method, a material is deduced from least one data set in at least one method step. A material is preferably deduced during machine learning 100a and/or recognition 102a. It is also possible for the detection device to utilize at least one object data set in the detection of a multiple object data set in method step 150a in order to deduce a material.

A further exemplary embodiment of the present invention is shown in each of FIGS. 4 through 6, 7 through 8, 9, 10, 11, 14, 15, and 16. The following descriptions and the drawings are limited essentially to the differences between the exemplary embodiments; with regard to components that are denoted in the same way, in particular with regard to components having the same reference numerals, reference may basically also be made to the drawings and/or the description of the other exemplary embodiment, in particular in FIGS. 1 through 3 and 12 and 13. To distinguish between the exemplary embodiments, the letter "a" is added as a suffix to the reference numerals of the exemplary embodiment in FIGS. 1 through 3 and 12 and 13. In the exemplary embodiment in FIGS. 4 through 6, 7 through 8, 9, 10, 11, 14, 15, and 16, the letter "a" is replaced by the letters "b" through "h."

Figure 4:
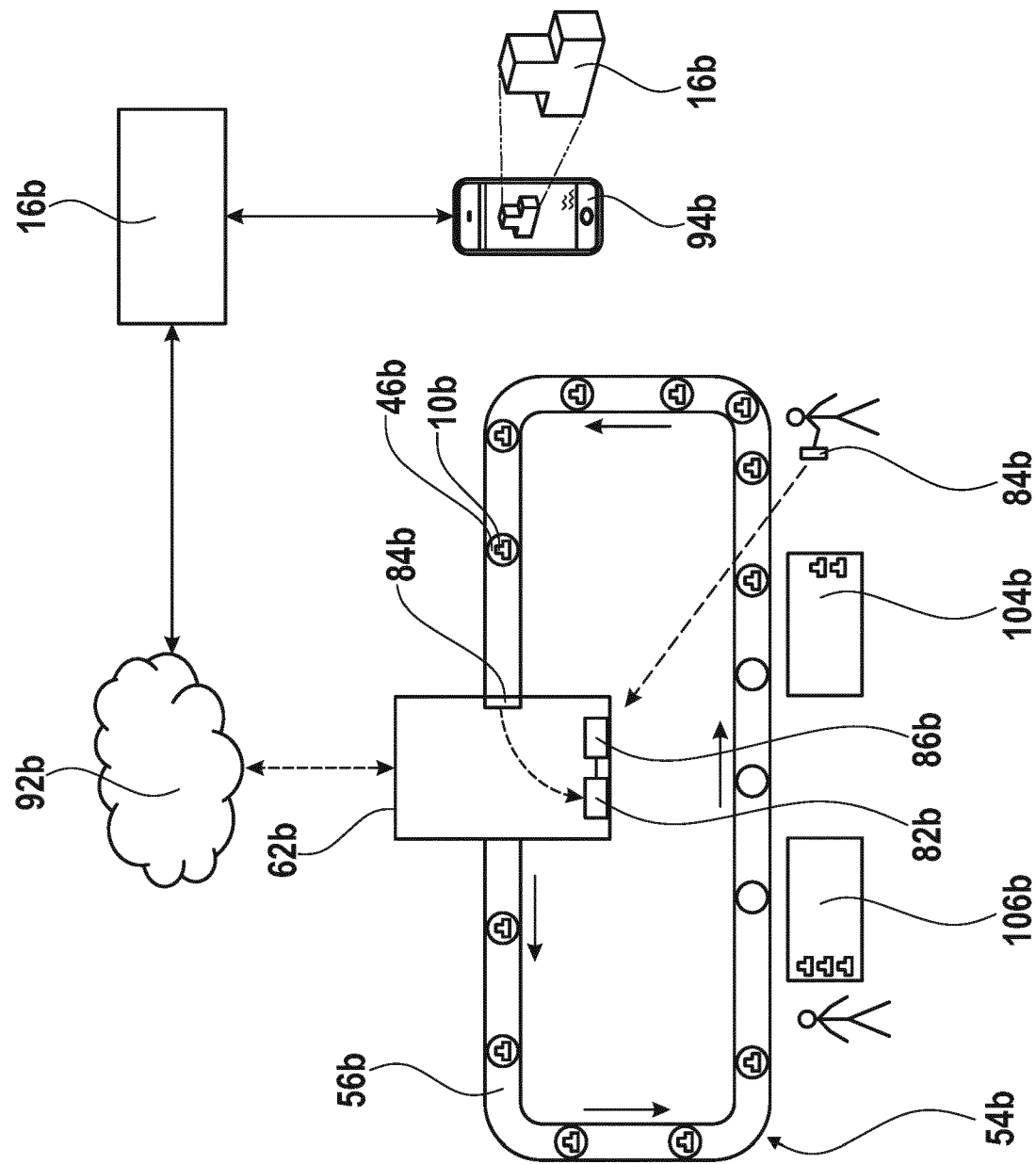
FIG. 4 shows a schematic illustration of a system for transparent object carriers.

FIG. 4 shows a schematic illustration of a system that includes a single object data detection area that is enclosed by a housing unit 62b. In particular, manual turning 103a (see FIG. 1) of the object may be avoided by using an object carrier 46b with an object carrier wall 48b (see FIG. 5) that is transparent in at least one operating state.

Figure 5:
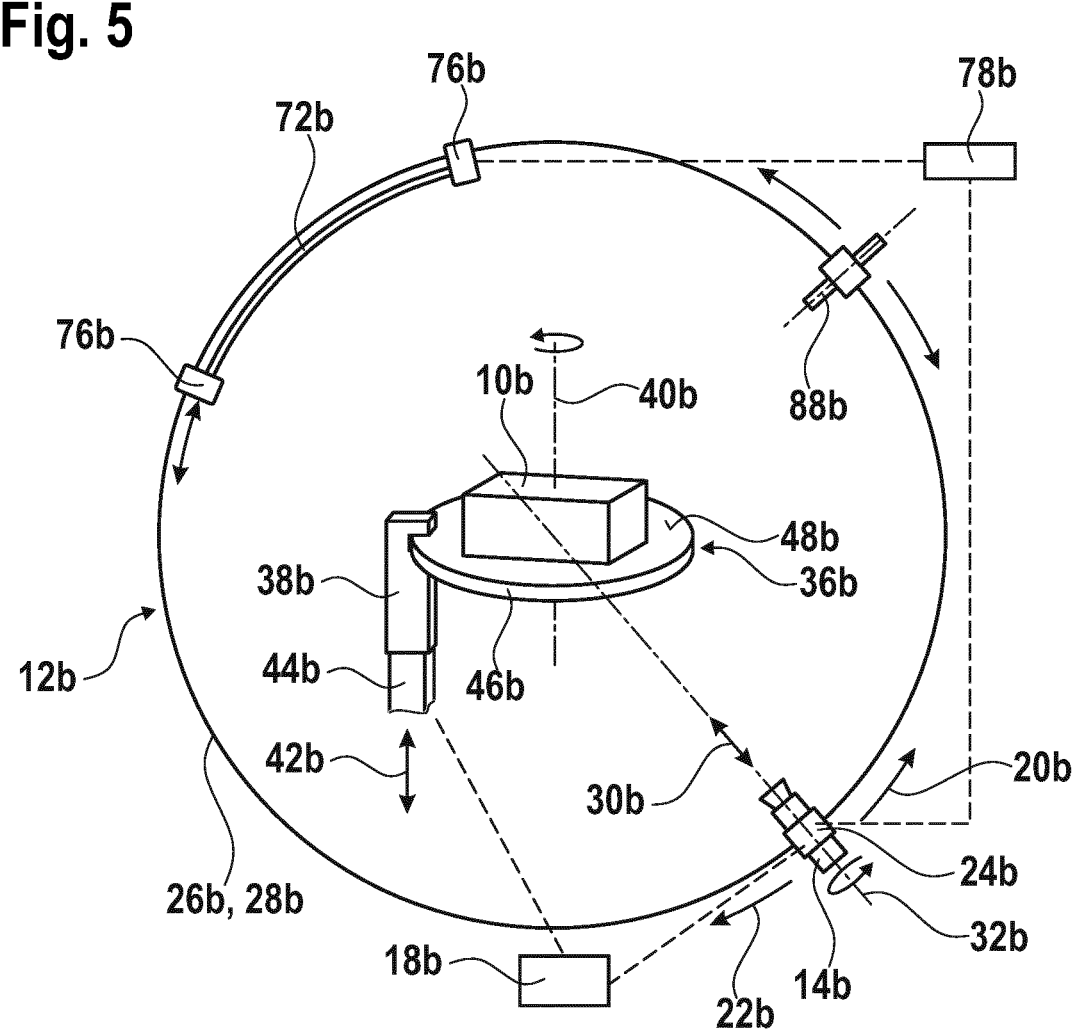
FIG. 5 shows a schematic illustration of the movement device, including a transparent object carrier.
Figure 6:
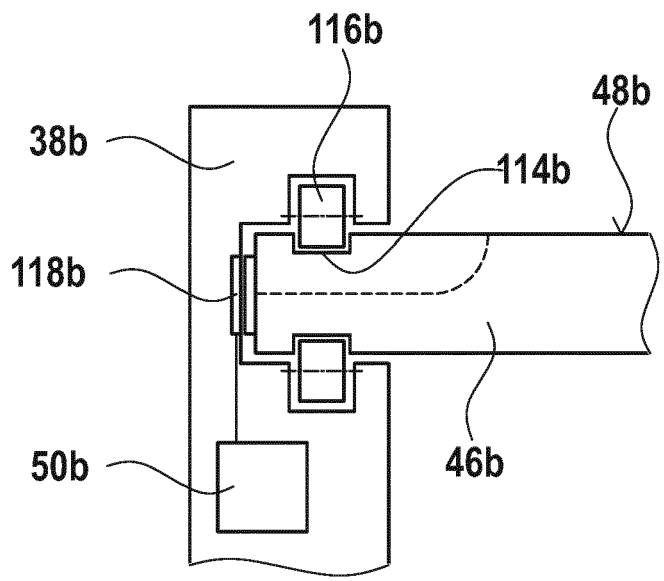
FIG. 6 shows a schematic illustration of the bearing unit in a lateral arrangement.

FIG. 5 shows a schematic illustration of movement device 12b, and FIG. 6 shows a schematic illustration of bearing unit 38b. Object carrier unit 36b includes at least one object carrier 46b that includes an object carrier wall 48b, which is transparent in at least one operating state. Object carrier unit 36b includes an adjustment unit 50b, with the aid of which a reflectance, an absorbance, and/or a transmittance are/is adjustable. Adjustment unit 50b is in particular connected to object carrier wall 48b via a sliding contact 118b. The transparency of object carrier 46b preferably allows a detection of object data from the side of object carrier 46b facing away from object 10b. For a detection of a multiple object data set, object 10b is preferably turned by 360° about swivel axis and/or rotational axis 40b. Object data detection unit 14b is preferably moved along curved path 28b at least on a circular arc having a center angle of 180°. Any arbitrary perspective, at least within a control and/or regulation accuracy of movement device 12b, may be assumed.

Bearing unit 38b is preferably situated to the side of object carrier unit 36b in order not to block a line of sight of object data detection unit 14b onto object 10b. Bearing unit 38b at least partially encompasses object carrier unit 36b. Object carrier unit 36b in particular includes a groove 114b for accommodating a rolling element 116b of bearing unit 38b. Groove 114b and rolling element 116b could also be designed as a rack and pinion gear, for example. In particular, the rotational axes of rolling element 116b are movably supported to allow locking/release of object carrier unit 36b to/from bearing unit 38b.

The detection device includes a contrast unit 72b, movement device 12b including a drive unit 76b for automatedly moving contrast unit 72b. The detection device includes a contrast unit 72b, movement device 12b including a movement unit 78b that is provided for simultaneously moving contrast unit 72b and object data detection unit 14b. In particular, movement unit 78b synchronizes drive units 76b and the drive unit, not illustrated in greater detail, of movement unit 24b. Processing unit 18b and movement unit 78b are preferably designed as a single central processing unit.

A dimension detection unit 88b includes a movement unit, in particular a guide carriage, that is independent from object data detection unit 14b.

Figure 7:
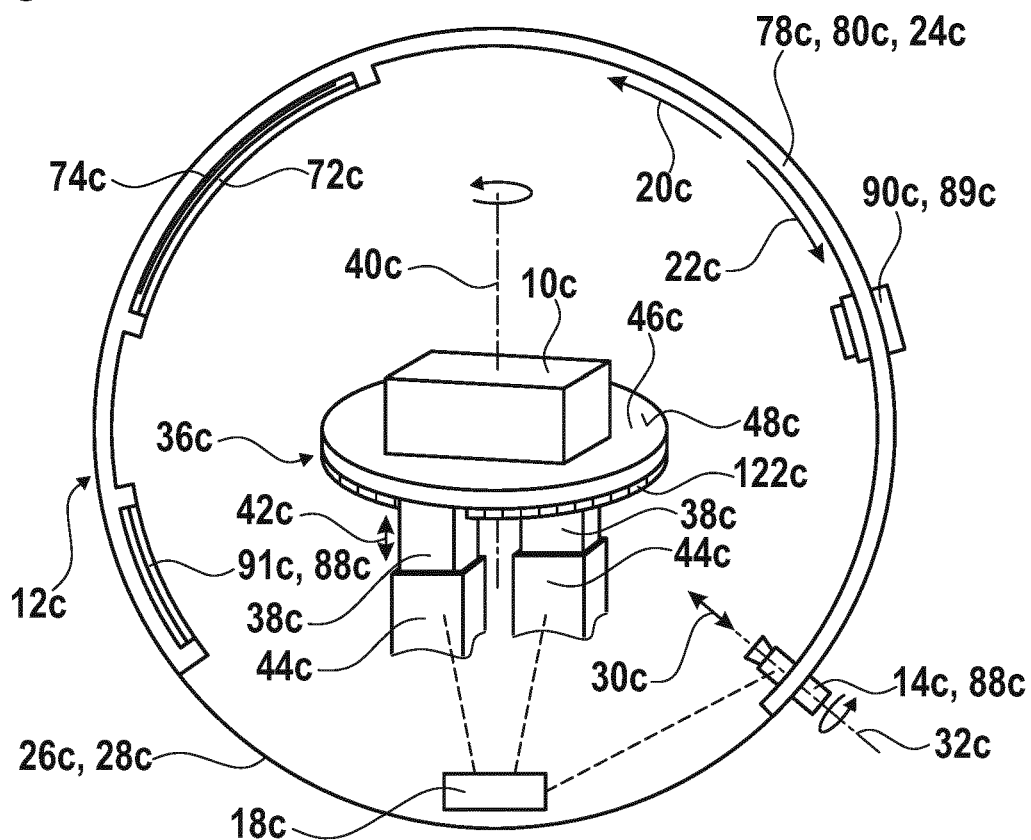
FIG. 7 shows a schematic illustration of the movement device, including a structural element for a simultaneous movement of the object data detection unit and the contrast unit.

In FIG. 7, the detection device includes a contrast unit 72c, movement unit 78c including a structural unit 80c which in at least one operating state essentially rigidly connects contrast unit 72c and object data detection unit 14c to one another in an. In particular, structural unit 80c is designed as a shared guide carriage. Contrast unit 72c is preferably provided for an active illumination. A light source 74c is in particular situated behind contrast unit 72c, viewed from object carrier unit 36c. The detection device includes a permeation unit 89c, in particular an X-ray unit, that is provided for at least partially permeating at least one object 10c. Permeation unit 89c preferably includes at least one beam source 90c and a shield 91c. Permeation unit 89c is preferably situated at movement unit 24c of object data detection unit 14c. Object data detection unit 14c at the same time is preferably utilized as a dimension detection unit 88c by linking the multiple object data sets in particular to a rotational speed of object carrier unit 36c about swivel axis and/or rotational axis 40c.

Figure 8:
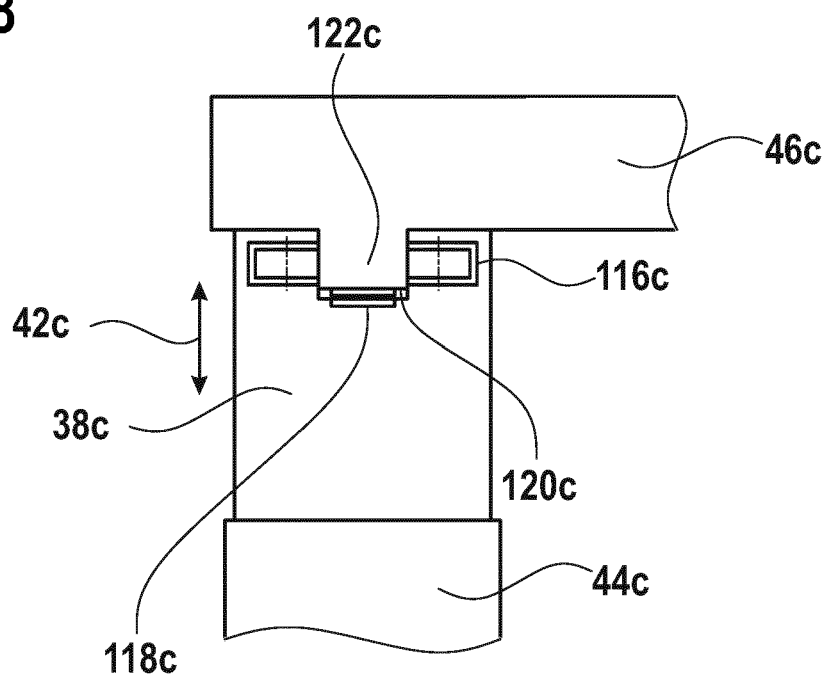
FIG. 8 shows a schematic illustration of the bearing unit in an arrangement on the bottom side.

FIGS. 7 and 8 show a schematic illustration of bearing unit 38c. Bearing unit 38c preferably has a two-part design. Bearing unit 38c is provided for accommodating a drive ring 122c, situated on the side of object carrier unit 36c facing away from object 10c, in a groove 120c of the bearing unit.

Figure 9:
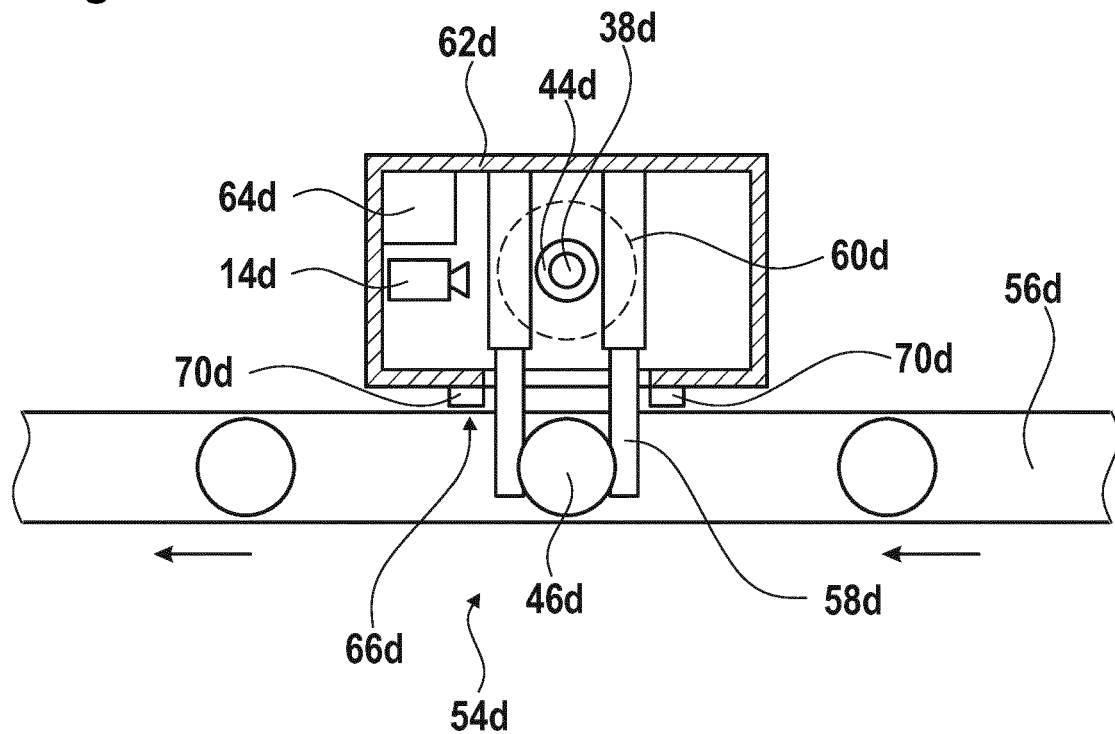
FIG. 9 shows a schematic illustration of the transport unit and a positioning unit.

FIG. 9 shows a detection device in which transport unit 54d is situated to the side of housing unit 62d. Transport unit 54d includes a positioning unit 58d for positioning an object in an object detection area 60d, in particular down from path conveyor unit 56d. In particular, positioning unit 58d is designed as extendable gripper units that are pushed beneath an object carrier 46d on transport unit 54d. Object carrier 46d preferably includes a recess on the side facing path conveyor unit 56d for accommodating a gripper unit. A connection of object carrier 46d to bearing unit 40d is preferably established when the gripper units are retracted.

The detection device includes an anti-pollution unit 64d that is provided for at least reducing a pollution of an object detection area 60d and/or an area of an object data detection unit 14d, in particular within housing unit 62d. Anti-pollution unit 64d is provided for generating a positive pressure within housing unit 62d. In particular, due to arranging anti-pollution unit 64d behind object data detection unit 14d and/or behind object detection area 60d, viewed from the opening of housing unit 62d, a fluid flow is generated that is directed from object data detection unit 14d and/or object detection area 60d to the opening of housing unit 62d. Penetration of dust and/or other dirt particles is advantageously reduced. The detection device includes a preparation unit 66d that is provided for preparing, in particular cleaning, at least one object prior to an object data set detection. Preparation unit 66d includes a fluid control unit 70d for controlling and/or regulating a fluid flow. In particular, the fluid control unit includes air nozzles. Fluid control unit 70d preferably generates an air flow that is directed away from housing unit 62d. An air flow that is generated by fluid control unit 70d is preferably directed onto an object carrier 46d situated in front of the opening of housing unit 62d. An air flow that is generated by fluid control unit 70d is preferably provided for blowing away dust particles and other pollution present on object carrier 46d and/or on an object on object carrier 46d, in particular in a direction facing away from housing unit 62d.

Figure 10:
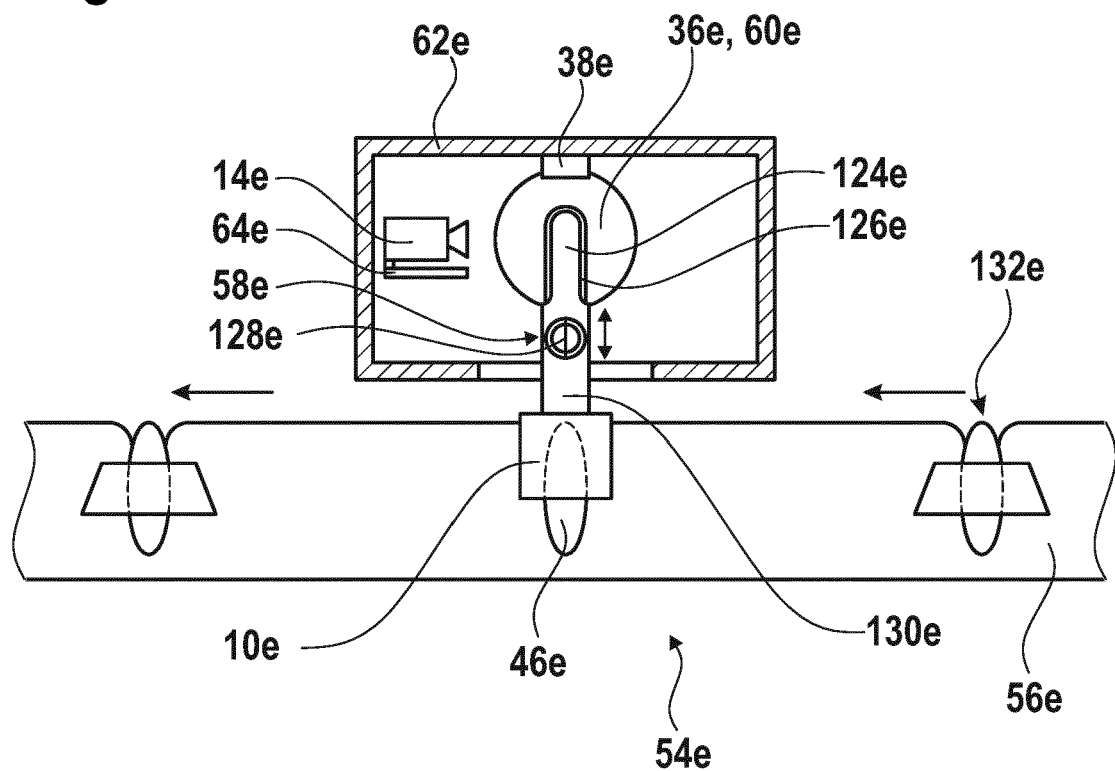
FIG. 10 shows a schematic illustration of the transport unit and a further positioning unit.

FIG. 10 shows a detection device in which transport unit 54e is situated to the side of housing unit 62e. Transport unit 54e includes a positioning unit 58e for positioning an object in an object detection area 60e, in particular down from path conveyor unit 56e. In particular, positioning unit 58e includes a magnetic base 128e that is movably supported in a guide path 130e. Magnetic base 128e preferably includes an electromagnet for switching the magnetic force. Alternatively, the magnetic base includes a permanent magnet. Magnetic base 128e is preferably automatically pushed beneath an object carrier 46e on the path conveyor unit 56e. Path conveyor unit 56e preferably includes a recess 132e through which magnetic base 128e establishes a force-fit connection to object carrier 46e. Object carrier 46e is preferably guided through recess 132e from path conveyor unit 56e to object carrier unit 36e. Object carrier unit 36e preferably includes a counterpart that is complementary to object carrier 46e. In particular, in at least one designated operating state the counterpart and object carrier 36e complement one another to form an essentially circular disk. In particular, object carrier unit 36e includes a recess 124e that is designed essentially as a negative shape of object carrier 46e. In particular, recess 124e includes a shoulder 126e for depositing object carrier 46e. The detection device includes an anti-pollution unit 64e that is provided for at least reducing a pollution of an area of an object data detection unit 14e, in particular within housing unit 62e. In particular, anti-pollution unit 64e is designed as an air nozzle. In particular, anti-pollution unit 64e generates a constant air flow that is directed away from object data detection unit 14e.

Figure 11:
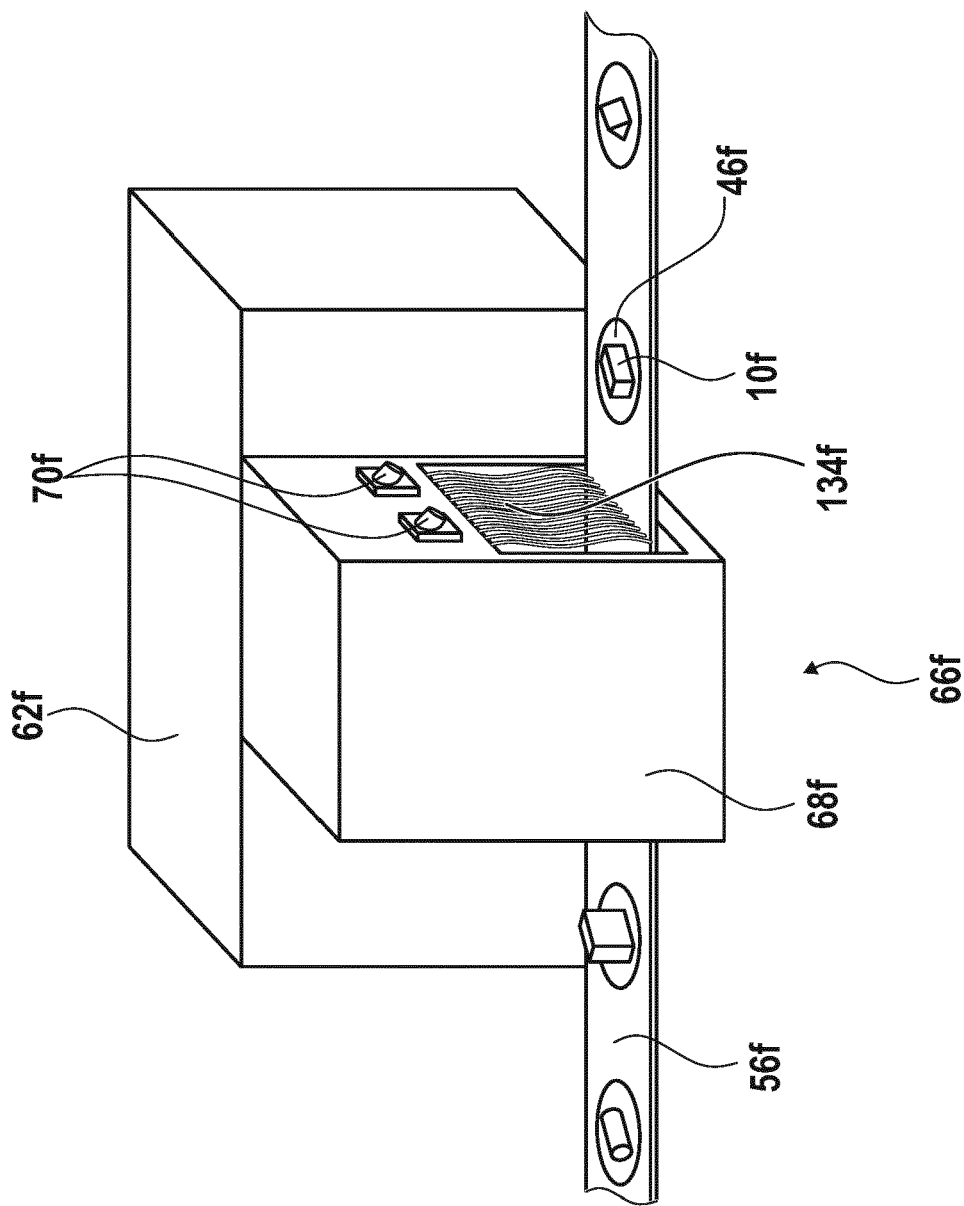
FIG. 11 shows a schematic illustration of the lock unit.

FIG. 11 shows the detection device, including a preparation unit 66f that is provided for preparing, in particular cleaning, at least one object 10f prior to an object data set detection. Preparation unit 66f includes a lock unit 68f. In particular, lock unit 68f includes a fluid restriction unit 134f. Fluid restriction unit 134f in particular includes plastic lamellae.

Fluid restriction unit 134f preferably generates a flow resistance, in particular for a flow into lock unit 68f. Preparation unit 66f includes a fluid control unit 70f for controlling and/or regulating a fluid flow. Fluid control unit 70f preferably generates an air flow that is directed away from lock unit 68f. An air flow generated by fluid control unit 70f is preferably directed onto an object carrier 46f situated directly in front of fluid restriction unit 134f. An air flow generated by fluid control unit 70f is preferably provided for blowing away dust particles and other pollution present on object carrier 46f and/or on an object 10f, in particular in a direction facing away from lock unit 68f. It is possible for further fluid control units to be mounted within lock unit 68f, for example for generating a positive pressure in lock unit 68f. It is also possible for the lock unit to include a fluid control unit for generating a water jet in order to clean an object situated in lock unit 68f. Airlock unit 68f preferably includes a fluid control unit in the form of a heater fan in order to dry an object situated in lock unit 68f.

Figure 14:
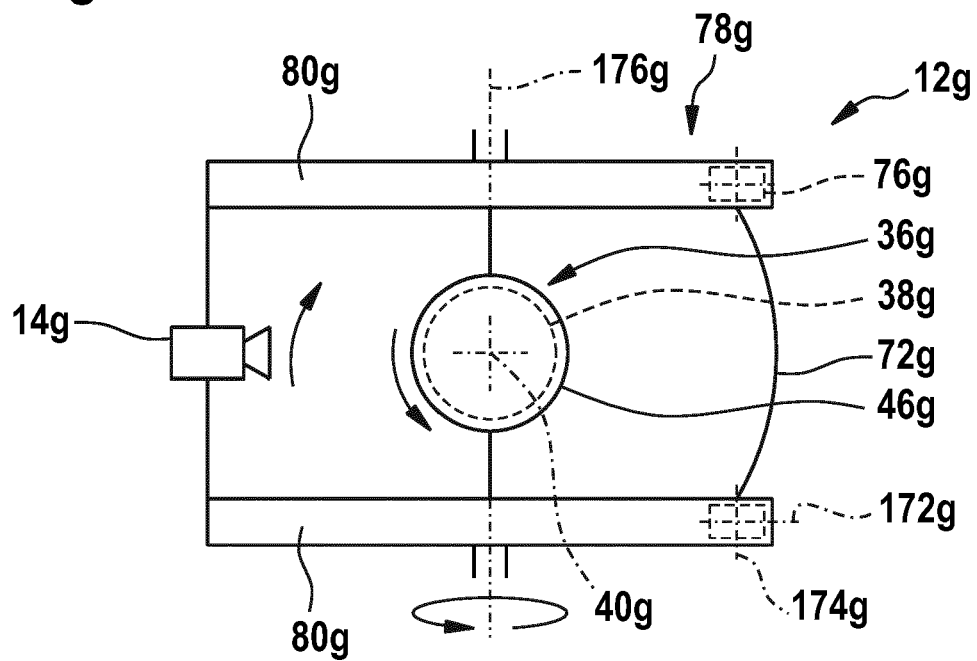
FIG. 14 shows a schematic illustration of a top view onto an alternative detection device.
Figure 15:
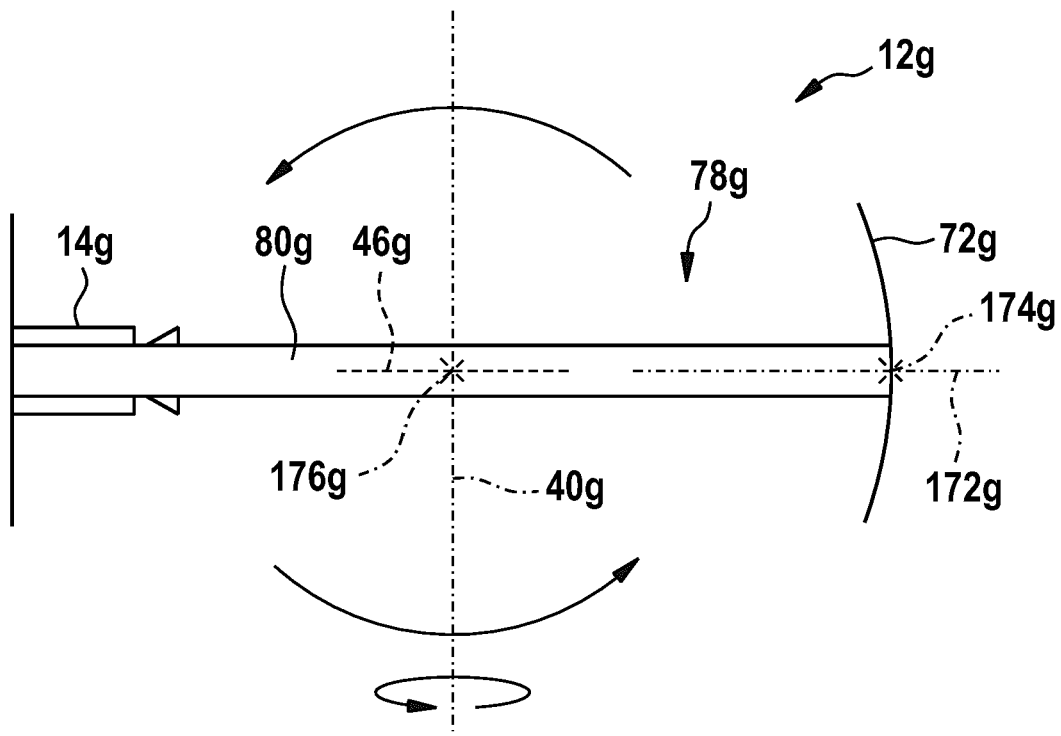
FIG. 15 shows a schematic illustration of a side view of the alternative detection device from FIG. 14.

FIGS. 14 and 15 show an alternative detection device for an at least semiautomated detection of multiple object data sets of at least one object (not illustrated in greater detail here). The detection device includes at least one movement device 12g for generating a defined relative movement between at least one object data detection unit 14g of the detection device and the at least one object, and/or an object carrier unit 36g of the detection device. The detection device illustrated in FIGS. 14 and 15 has a design that is at least essentially analogous to the detection device described in the description of FIGS. 1 through 3, so that with regard to a design of the detection device illustrated in FIGS. 14 and 15, reference may be made at least essentially to the description of FIGS. 1 through 3.

In contrast to the detection device described in the description of FIGS. 1 through 3, the detection device illustrated in FIGS. 14 and 15 preferably includes a contrast unit 72g which in at least one operating state of the detection device is movably supported, together with object data detection unit 14g, relative to object carrier unit 36g, in particular with the aid of movement device 12g. Movement device 12g preferably includes a movement unit 78g that is provided for simultaneously moving contrast unit 72g and object data detection unit 14g. Movement unit 78g includes a structural unit 80g which in at least one operating state essentially rigidly connects contrast unit 72g and object data detection unit 14g to one another, in particular to achieve a shared movement of contrast unit 72g and object data detection unit 14g. Alternatively or additionally, contrast unit 72g is movably supported relative to object data detection unit 14g with the aid of movement device 12g. With the aid of movement unit 78g, contrast unit 72g is preferably movably supported relative to object data detection unit 14g along a translation axis 172g of movement device 12g and/or about a tilt axis 174g of movement device 12g. Translation axis 172g preferably extends transversely, in particular at least essentially perpendicularly, with respect to tilt axis 174g. Movement device 12g includes in particular a drive unit 76g for an automated movement of contrast unit 72g.

Object data detection unit 14g and/or contrast unit 72g are/is preferably movably supported about a swivel axis and/or rotational axis 40g of a bearing unit 38g of movement device 12g relative to object carrier unit 36g with the aid of movement device 12g. Movement device 12g preferably includes a drive unit (not illustrated in greater detail here) that is provided for moving, in particular in at least one operating state of the detection device, object data detection unit 14g, preferably together with contrast unit 72g, oppositely from a movement of object carrier unit 36g, in particular about swivel axis and/or rotational axis 40g of bearing unit 38g. With the aid of movement device 12g, object data detection unit 14g and/or contrast unit 72g are/is preferably also movably supported relative to object carrier unit 36g about a horizontal axis 176g of movement device 12g that extends transversely, in particular at least essentially perpendicularly, with respect to swivel axis and/or rotational axis 40g of bearing unit 38g. It is possible for object carrier unit 36g to be supported in such a way that a support structure of the detection device on which object carrier unit 36g is fixed or movably supported has a main longitudinal axis that extends at least essentially in parallel, in particular coaxially, to horizontal axis 176g. Translation axis 172g preferably extends transversely, in particular at least essentially perpendicularly, to horizontal axis 176g. Tilt axis 174g preferably extends at least essentially in parallel to horizontal axis 176g.

With the aid of movement device 12g, object data detection unit 14g and/or contrast unit 72g are/is preferably movably supported about object carrier unit 36g in an arrangement of object carrier unit 36g on the support structure, viewed in a vertical plane. Object data detection unit 14g and/or contrast unit 72g with the aid of movement device 12g are/is preferably movably supported about horizontal axis 178g along an angular range of less than 360°, in particular less than 270°, preferably less than 180°, relative to a horizontal plane of the detection device. Other movement options of object data detection unit 14g, contrast unit 72g, and/or object carrier unit 36g relative to one another that appear meaningful to those skilled in the art are likewise possible. With regard to further features and functions of the detection device illustrated in FIGS. 14 and 15, reference may be made in particular to the detection device described in the description of FIGS. 1 through 3.

Figure 16:
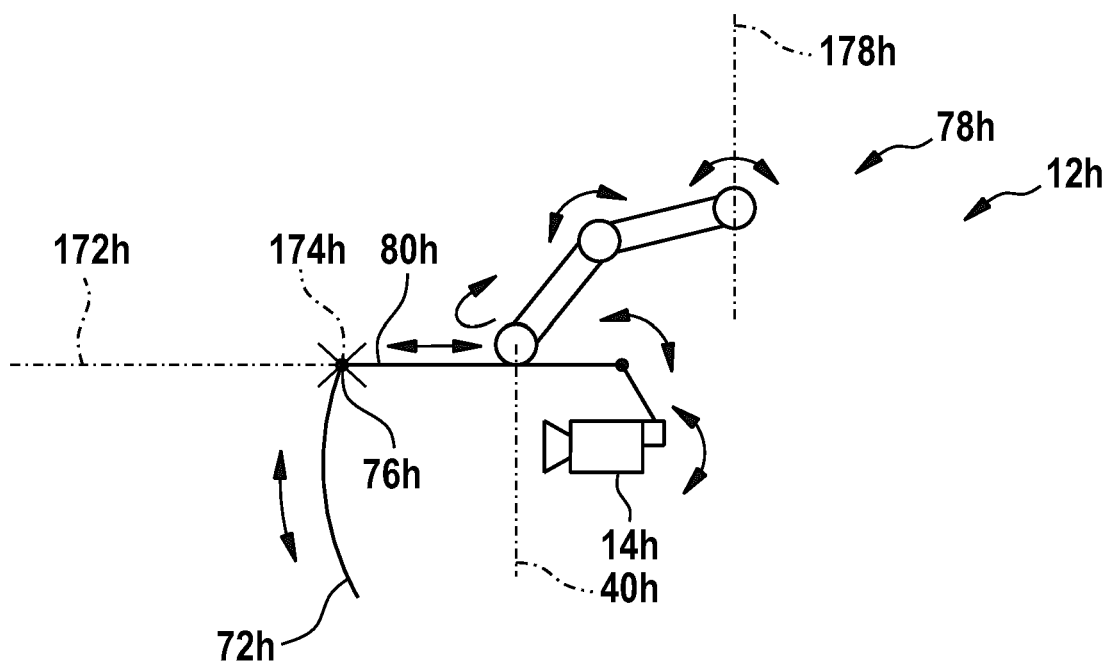
FIG. 16 shows a schematic illustration of a further alternative detection device.

FIG. 16 shows a further alternative detection device for an at least semiautomated detection of multiple object data sets of at least one object (not illustrated in greater detail here). The detection device includes at least one movement device 12h for generating a defined relative movement between at least one object data detection unit 14h of the detection device and the at least one object and/or an object carrier unit (not illustrated in greater detail here) of the detection device. The detection device illustrated in FIG. 16 has a design that is at least essentially analogous to the detection devices described in the description of FIGS. 1 through 3 and in the description of FIGS. 14 and 15, so that with regard to a design of the detection device illustrated in FIG. 16, reference may be made at least essentially to the description of FIGS. 1 through 3 and FIGS. 14 and 15.

In contrast to the detection devices described in the description of FIGS. 1 through 3 and in the description of FIGS. 14 and 15, the detection device illustrated in FIG. 16 includes object data detection unit 14h and at least one contrast unit 72h that are movably supported with the aid of movement device 12h, movement device 12h including a movement unit 78g that is designed as a multiaxial robotic arm. In addition, it is possible for object data detection unit 14h and/or contrast unit 72h of the detection device illustrated in FIG. 16, in addition to a movable bearing about a swivel axis and/or rotational axis 40h, to be movably supported about a further swivel axis and/or rotational axis 178h of movement device 12h. Further swivel axis and/or rotational axis 178h preferably extend(s) at least essentially in parallel to swivel axis and/or rotational axis 40h.

Object data detection unit 14h and contrast unit 72h with the aid of movement device 12h are preferably movably supported together relative to one another about more than two, in particular about at least three, axes of movement unit 78g, designed as a multiaxial robotic arm, that extend at least essentially in parallel. It is possible for object data detection unit 14h with the aid of movement device 12h to be additionally movably supported relative to contrast unit 72h about two further axes of movement unit 78g, designed as a multiaxial robotic arm, that extend at least essentially in parallel. With regard to further features and functions of the detection device illustrated in FIG. 16, reference may be made in particular to the detection devices described in the description of FIGS. 1 through 3 and in the description of FIGS. 14 and 15.

What is claimed is:

1. A detection device for an at least semi-automated detection of multiple object data sets of at least one object, comprising:
    a movement device to generate a defined relative movement between at least one object data detection unit and the at least one object, wherein the movement device is for detecting object data of the at least one object from multiple perspectives;
    a guide carriage, which includes the at least one object data detection unit and a dimension detection unit;
    two curved parallel paths, wherein each of the curved parallel paths includes a guard rail, and wherein the guide carriage is situated on the guard rails between the curved parallel paths; and
    an object carrier unit;
    wherein the guide carriage includes a drive unit for moving the guide carriage along the guard rails, so that the guide carriage, the drive unit, the at least one object data detection unit, and the dimension detection unit move together,
    wherein the movement device includes a bearing unit via which object carrier unit is movably supported, and
    wherein the bearing unit has at least one swivel axis and/or rotational axis about which the object carrier unit is swivelably and/or rotatably supported.

2. The detection device as recited in claim 1, further comprising:
    at least one contrast unit for an active illumination.

3. The detection device as recited in claim 1, further comprising:
    at least one contrast unit which includes at least one light source.

4. The detection device as recited in claim 1, further comprising:
    at least one contrast unit which includes at least one light-emitting diode.

5. The detective device as recited in claim 1, wherein the at least one light-emitting diode includes at least one organic light-emitting diode.

6. The detection device as recited in claim 1, further comprising:
    at least one contrast unit, wherein the movement device includes a drive unit for an automated movement of the contrast unit.

7. The detection device as recited in claim 1, further comprising:
    the object data detection unit; and
    at least one contrast unit;
    wherein the movement device includes a movement unit to simultaneously move the contrast unit and the object data detection unit.

8. The detection device as recited in claim 7, further comprising:
    the object data detection unit; and
    at least one contrast unit;
    wherein the movement unit includes a structural unit which, in at least one operating state, rigidly connects the contrast unit and the object data detection unit to one another.

9. The detective device as recited in claim 1, wherein the bearing unit includes at least another movement path along which the object carrier unit is movably supported, and wherein the object carrier unit is movably supported and/or rotatably supported, relative to the object data detection unit via the bearing unit.

10. A system, comprising:
    a detection device for an at least semi-automated detection of multiple object data sets of at least one object, the detection device including a movement device to generate a defined relative movement between at least one object data detection unit and the at least one object, wherein the movement device is for detecting object data of the at least one object from multiple perspectives;
    a memory unit with data sets that are at least partially generated using the detection device;
    a mobile detection unit; and a processing unit to evaluate data that are detected by the mobile detection unit, at least based on the data sets of the memory unit;

a guide carriage, which includes the at least one object data detection unit and a dimension detection unit;

two curved parallel paths, wherein each of the curved parallel paths includes a guard rail, and wherein the guide carriage is situated on the guard rails between the curved parallel paths; and an object carrier unit;

wherein the guide carriage includes a drive unit for moving the guide carriage along the guard rails, so that the guide carriage, the drive unit, the at least one object data detection unit, and the dimension detection unit move together, wherein the movement device includes a bearing unit via which object carrier unit is movably supported, and wherein the bearing unit has at least one swivel axis and/or rotational axis about which the object carrier unit is swivelably and/or rotatably supported.

11. A method for at least semi-automatedly detecting multiple object data sets of at least one object, the method comprising:

generating, via a movement device of a detection device, a defined relative movement between at least one object data detection unit and the at least one object, wherein there is a memory unit with data sets that are at least partially generated using the detection device, wherein the movement device is for detecting object data of the at least one object from multiple perspectives; and evaluating, via a processing unit, data that are detected by a mobile detection unit, at least based on the data sets of the memory unit; and detecting the multiple object data sets of the at last one object;

wherein the movement device includes a bearing unit via which object carrier unit is movably supported, wherein the bearing unit has at least one swivel axis and/or rotational axis about which the object carrier unit is swivelably and/or rotatably supported, wherein the detection device includes:

a guide carriage, which includes the at least one object data detection unit and a dimension detection unit;

two curved parallel paths, wherein each of the curved parallel paths includes a guard rail, and wherein the guide carriage is situated on the guard rails between the curved parallel paths; and an object carrier unit;

wherein the guide carriage includes a drive unit for moving the guide carriage along the guard rails, so that the guide carriage, the drive unit, the at least one object data detection unit, and the dimension detection unit move together, wherein the movement device includes a bearing unit via which the object carrier unit is movably supported, and wherein the bearing unit has at least one swivel axis and/or rotational axis about which the object carrier unit is swivelably and/or rotatably supported.

12. The method as recited in claim 11, wherein a movement parameter and/or a position parameter of a contrast unit of the detection device is changed as a function of a parameter of an object to be detected, and/or of a parameter of the object data detection unit, and/or of a parameter of an illumination unit of the detection device.

* * * * *